(12) United States Patent
Eidson et al.

(10) Patent No.: US 10,956,418 B2
(45) Date of Patent: *Mar. 23, 2021

(54) METHODS AND SYSTEMS FOR JOINING INDEXES FOR QUERY OPTIMIZATION IN A MULTI-TENANT DATABASE

(71) Applicant: salesforce.com, inc., San Francisco, CA (US)

(72) Inventors: William Charles Eidson, Palo Alto, CA (US); Jesse Collins, Oakland, CA (US)

(73) Assignee: salesforce.com, inc., San Francisco, CA (US)

( * ) Notice: Subject to any disclaimer, the term of this patent is extended or adjusted under 35 U.S.C. 154(b) by 163 days.

This patent is subject to a terminal disclaimer.

(21) Appl. No.: 15/924,023

(22) Filed: Mar. 16, 2018

(65) Prior Publication Data

US 2018/0276276 A1  Sep. 27, 2018

Related U.S. Application Data

(63) Continuation of application No. 15/212,115, filed on Jul. 15, 2016, now Pat. No. 9,946,751, which is a
(Continued)

(51) Int. Cl.
*G06F 16/2453* (2019.01)
*G06F 16/22* (2019.01)
*G06F 16/2458* (2019.01)

(52) U.S. Cl.
CPC .... *G06F 16/24544* (2019.01); *G06F 16/2246* (2019.01); *G06F 16/2453* (2019.01); *G06F 16/2462* (2019.01); *G06F 16/24542* (2019.01)

(58) Field of Classification Search
CPC ......... G06F 16/24544; G06F 16/24542; G06F 16/2462; G06F 16/2453; G06F 16/2246
(Continued)

(56) References Cited

U.S. PATENT DOCUMENTS 5,577,188 A  11/1996  Zhu
5,608,872 A   3/1997  Schwartz et al.
(Continued)

FOREIGN PATENT DOCUMENTS

WO         01/077787 A3   10/2001
WO    WO 2008/060860 A2    5/2008

OTHER PUBLICATIONS

Oracle: "Oracle9i Data Cartridge Developers Guide," internet (online) XP002406393, 28 pages. Retrieved on Nov. 8, 2006 from http://www.lc.leidenuniv.nl/awcourse/oracle/appdev.920/a96595.pdf.
(Continued)

*Primary Examiner* — Phong H Nguyen
(74) *Attorney, Agent, or Firm* — Jaffery Watson Mendonsa & Hamilton LLP

(57) ABSTRACT

Methods and systems for query optimization for a multi-tenant database system are provided. Some embodiments comprise receiving at a network interface of a server in a multi-tenant database system an original query transmitted to the multi-tenant database system by a user associated with a tenant, wherein the original query is associated with data accessible by the tenant, and wherein the multi-tenant database system includes at least a first index and a second index. Metadata associated with the data is retrieved, wherein at least a portion of the data is stored in a common table within the multi-tenant database system. A tenant-selective query syntax is determined by analyzing at least one of metadata generated from information about the tenant or metadata generated from the data accessible by the tenant. An improved query is then generated using the query syntax, wherein the improved query is based at least in part upon the original query and a result of a join between a first number of rows associated with the first index and a second number of rows associated with the second index.

20 Claims, 10 Drawing Sheets

| Custom entity id | org id | Val 0 | Val 1 | Val 2 | Val 3 | Val 4 |
|---|---|---|---|---|---|---|
| ao1......1 | ood 1 | | | | | |
| ao1......2 | ood 1 | | | | | |
| : | : | | | | | |
| ao1....38 | ood 1 | | | | | |
| ao2....39 | ood 1 | (FK:acc id) | (asset name) | (asset value) | (asset depreciation type) | (asset replacement date) |
| : | : | : | : | : | : | : |
| ao2....53 | ood 1 | 001............9 | | | | 20050601 |
| ao2....54 | ood 1 | 001............8 | | | | 20060921 |
| : | : | : | : | : | : | : |
| ao2....61 | ood 1 | 001............10 | | | | 20070331 |
| ao2....90 | : | : | : | : | : | : |
| ao1....91 | ood N | | | | | |
| : | | | | | | |

Related U.S. Application Data continuation of application No. 14/222,091, filed on Mar. 21, 2014, now Pat. No. 9,405,797, which is a continuation of application No. 12/887,367, filed on Sep. 21, 2010, now Pat. No. 8,706,715.

(60) Provisional application No. 61/248,813, filed on Oct. 5, 2009.

(58) Field of Classification Search
USPC .................... 707/713, 714, 715, 741, 759
See application file for complete search history.

(56) References Cited

U.S. PATENT DOCUMENTS

| | | | |
|---|---|---|---|
| 5,649,104 A | 7/1997 | Carleton et al. | |
| 5,715,450 A | 2/1998 | Ambrose et al. | |
| 5,737,592 A | 4/1998 | Nguyen et al. | |
| 5,761,419 A | 6/1998 | Schwartz et al. | |
| 5,794,229 A | 8/1998 | French et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,062 A | 7/2000 | Lohman et al. | |
| 6,092,083 A | 7/2000 | Brodersen et al. | |
| 6,112,209 A | 8/2000 | Gusack | |
| 6,169,534 B1 | 1/2001 | Raffel et al. | |
| 6,173,439 B1 | 1/2001 | Carlson et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,275,818 B1 * | 8/2001 | Subramanian | G06F 16/2454 707/999.003 |
| 6,275,825 B1 | 8/2001 | Kobayashi et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,356,915 B1 | 3/2002 | Chtchetkine et al. | |
| 6,363,371 B1 | 3/2002 | Chaudhuri et al. | |
| 6,367,077 B1 | 4/2002 | Brodersen et al. | |
| 6,377,955 B1 | 4/2002 | Hartmann et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,529,901 B1 | 3/2003 | Chaudhuri et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,587,854 B1 | 7/2003 | Guthrie et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,611,840 B1 | 8/2003 | Baer et al. | |
| 6,618,719 B1 * | 9/2003 | Andrei | G06F 16/24547 707/999.003 |
| 6,621,834 B1 | 9/2003 | Scherpbier et al. | |
| 6,654,032 B1 | 11/2003 | Zhu et al. | |
| 6,654,039 B1 | 11/2003 | Hollines, III et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,694,306 B1 * | 2/2004 | Nishizawa | G06F 16/24539 707/714 |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshaysky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,782,383 B2 | 8/2004 | Subrarnaniam et al. | |
| 6,804,330 B1 | 10/2004 | Jones et al. | |
| 6,804,680 B2 | 10/2004 | Melli | |
| 6,823,384 B1 | 11/2004 | Wilson et al. | |
| 6,826,565 B2 | 11/2004 | Ritchie et al. | |
| 6,826,582 B1 | 11/2004 | Chatterjee | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,113,993 B1 * | 9/2006 | Cappiello | H04L 67/1008 709/227 |
| 7,246,128 B2 * | 7/2007 | Jordahl | G06F 16/24578 707/999.102 |
| 7,289,976 B2 | 10/2007 | Kihneman et al. | |
| 7,340,411 B2 | 3/2008 | Cook | |
| 7,340,481 B1 * | 3/2008 | Baer | G06F 40/166 707/999.103 |
| 7,430,562 B1 * | 9/2008 | Bedell | G06F 16/24542 707/999.002 |
| 7,434,257 B2 | 10/2008 | Garg et al. | |
| 7,620,655 B2 | 11/2009 | Larsson et al. | |
| 8,041,728 B2 * | 10/2011 | Dettinger | G06F 16/2425 707/766 |
| 8,468,244 B2 * | 6/2013 | Redlich | G06Q 10/107 709/225 |
| 8,543,566 B2 * | 9/2013 | Weissman | G06F 16/2453 707/713 |
| 8,706,715 B2 * | 4/2014 | Eidson | G06F 16/2246 707/714 |
| 2001/0044791 A1 | 11/2001 | Richter et al. | |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |
| 2002/0035577 A1 | 3/2002 | Brodersen et al. | |
| 2002/0042264 A1 | 4/2002 | Kim | |
| 2002/0042843 A1 | 4/2002 | Diec | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0133484 A1 | 9/2002 | Chau et al. | |
| 2002/0140731 A1 | 10/2002 | Subramaniam et al. | |
| 2002/0143997 A1 | 10/2002 | Huang et al. | |
| 2002/0152102 A1 | 10/2002 | Brodersen et al. | |
| 2002/0161734 A1 | 10/2002 | Stauber et al. | |
| 2002/0162090 A1 | 10/2002 | Parnell et al. | |
| 2002/0165742 A1 | 11/2002 | Robins | |
| 2002/0174128 A1 | 11/2002 | Govindarajan et al. | |
| 2003/0004971 A1 | 1/2003 | Gong et al. | |
| 2003/0014394 A1 * | 1/2003 | Fujiwara | G06F 16/284 707/999.003 |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachadran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0088545 A1 | 5/2003 | Subramaniam et al. | |
| 2003/0088579 A1 | 5/2003 | Brown et al. | |
| 2003/0120675 A1 | 6/2003 | Stauber et al. | |
| 2003/0151633 A1 | 8/2003 | George et al. | |
| 2003/0154197 A1 | 8/2003 | Millet et al. | |
| 2003/0159136 A1 | 8/2003 | Huang et al. | |

(56) References Cited

U.S. PATENT DOCUMENTS

| | | |
|---|---|---|
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0036716 A1* | 2/2004 | Jordahl ............. G06F 16/24578 715/713 |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050041 A1 | 3/2005 | Galindo-Legaria et al. |
| 2005/0050555 A1 | 3/2005 | Exley et al. |
| 2005/0071345 A1 | 3/2005 | Lin |
| 2005/0091098 A1 | 4/2005 | Brodersen et al. |
| 2005/0216465 A1* | 9/2005 | Dutta ................... G06F 16/217 707/999.009 |
| 2005/0246338 A1* | 11/2005 | Bird .................. G06F 16/90335 707/999.009 |
| 2006/0074934 A1* | 4/2006 | Dettinger ............ G06F 16/2425 707/E17.044 |
| 2006/0106776 A1* | 5/2006 | Dettinger ............ G06F 16/2428 707/999.003 |
| 2006/0235831 A1* | 10/2006 | Adinolfi ................. G06Q 40/00 707/999.003 |
| 2007/0124276 A1* | 5/2007 | Weissman ......... G06F 16/24575 707/999.002 |
| 2007/0239741 A1* | 10/2007 | Jordahl ............. G06F 16/24578 707/999.1 |
| 2008/0120274 A1 | 5/2008 | Cruanes et al. |
| 2008/0168135 A1* | 7/2008 | Redlich ............... G06F 21/6218 709/204 |
| 2009/0177744 A1 | 7/2009 | Marlow et al. |
| 2009/0254572 A1* | 10/2009 | Redlich .................. G06Q 10/06 707/999.01 |
| 2010/0191758 A1* | 7/2010 | Peng ..................... G06F 16/353 707/759 |
| 2011/0246449 A1* | 10/2011 | Collins ............. G06F 16/24542 707/715 |

OTHER PUBLICATIONS

"Guide to Client SQL Query Performance Tuning", 9 pages. Retrieved on Sep. 23, 2003 from http://www.agsrhichome.bnl.gov/Controls/doc/database/opt_query.html.

Haydu J. and Subramanian S., "Analytic SQL Features in Oracle9i", An Oracle Technical White Paper, Dec. 2001, pp. 1-32.

"IBM eServer, iSeries, DB2 Universal Database for iSeries—Database Performance and Query Optimization", 2000, 2001, 2002.

Kollar L., "Statistics Used by the Query Optimizer in Microsoft SQL Server 2000", 12 pages. Retrieved on Jun. 14, 2011 from http://msdn.microsoft.com/en-us/library/aa902688(d=printer,v=sql.80).aspx.

Lumpkin G. and Jakobsson H., "Query Optimization in Oracle9i", Oracle White Paper, Feb. 2002, pp. 1-30.

"Oracle Tuning Pack" Data Sheet—Oracle Corporation, 5 pages. Retrieved on Sep. 23, 2003 from http://otn.oracle.com/products/oracle9i/datasheets/oem_tuning/9iR2_sub.

Venkataraman S. and Zhang T., "Heterogeneous Database Query Optimization in DB2 Universal Data Joiner", Proceedings of the 24th VLDB Conference, 1998, pp. 685-689, New York, USA.

International Search Report and Written Opinion of the International Searching Authority for PCT Application No. PCT/US2010/051456, dated Dec. 16, 2010, 19 pages.

Non-Final Office Action for U.S. Appl. No. 10/669,523, dated Oct. 21, 2005, 8 pages.

Final Office Action for U.S. Appl. No. 10/669,523, dated Mar. 23, 2006, 9 pages.

Non-Final Office Action for U.S. Appl. No. 10/669,523, dated Oct. 4, 2006, 10 pages.

Final Office Action for U.S. Appl. No. 10/669,523, dated Jun. 12, 2007, 9 pages.

Non-Final Office Action for U.S. Appl. No. 10/669,523, dated Jan. 9, 2008, 9 pages.

Final Office Action for U.S. Appl. No. 10/669,523, dated Jul. 3, 2008, 11 pages.

Notice of Allowance for U.S. Appl. No. 10/669,523, dated Jan. 30, 2009, 6 pages.

Non-Final Office Action for U.S. Appl. No. 10/817,161, dated Oct. 26, 2006, 10 pages.

Final Office Action for U.S. Appl. No. 10/817,161, dated Jul. 27, 2007, 12 pages.

Non-Final Office Action for U.S. Appl. No. 10/817,161, dated Feb. 25, 2009, 13 pages.

Final Office Action for U.S. Appl. No. 10/817,161, dated Nov. 9, 2009, 18 pages.

Notice of Allowance for U.S. Appl. No. 10/817,161, dated Apr. 12, 2010, 7 pages.

Notice of Allowance for U.S. Appl. No. 12/887,367, dated Nov. 26, 2013, 13 pages.

Non-Final Office Action for U.S. Appl. No. 14/222,091 dated Sep. 24, 2014, 16 pages.

Non-Final Office Action for U.S. Appl. No. 12/887,367 dated Mar. 21, 2013, 12 pages.

Non-Final Office Action for U.S. Appl. No. 12/887,367 dated Jul. 17, 2012, 15 pages.

Final Office Action for U.S. Appl. No. 12/887,367 dated Dec. 12, 2012, 15 pages.

Final Office Action for U.S. Appl. No. 14/222,091 dated Mar. 4, 2015, 14 pages.

Non-Final Office Action for U.S. Appl. No. 14/222,091 dated Jun. 24, 2015, 18 pages.

Final Office Action for U.S. Appl. No. 14/222,091 dated Oct. 16, 2015, 18 pages.

Notice of Allowance for U.S. Appl. No. 14/222,091 dated Mar. 28, 2016, 9 pages.

Final Office Action for U.S. Appl. No. 15/212,115 dated Feb. 24, 2017, 27 pages.

Non-Final Office Action for U.S. Appl. No. 15/212,115, dated Jun. 14, 2017, 17 pages.

Non-Final Office Action for U.S. Appl. No. 15/212,115 dated Oct. 27, 2016, 24 pages.

Notice of Allowance for U.S. Appl. No. 15/212,115 dated Dec. 15, 2017, 7 pages.

* cited by examiner

```
select account_id, name
from
sales.account where organization_id = '00D300000000XXX' and created_date >
    to_date('2009-04-20 00:00:00') and owner = '005300000000XXXX' call      count      cpu      elapsed      disk      query      current      rows
-------   -------   -------   ---------   -------   -------    ---------   -------
Parse        1        0.00      0.00         0          0           0          0
Execute      1        0.00      0.00         0          0           0          0
Fetch        2        0.00      0.00         0        3028          0          3
-------   -------   -------   ---------   -------   -------    ---------   -------
total        4        0.01      0.01         0        3028          0          3

Misses in library cache during parse: 1
Optimizer mode: ALL_ROWS
Parsing user id: 106

Rows     Row Source Operation
-------  ---------------------------------------------------
    3    PARTITION HASH SINGLE PARTITION: 9 9 (cr=3028 pr=0 pw=0 time=2352 us)
    3    TABLE ACCESS BY LOCAL INDEX ROWID ACCOUNT PARTITION: 9 9 (cr=3028 pr=0 pw=0 time=2341 us)
 3342    INDEX RANGE SCAN IEACCOUNT_CREATED PARTITION: 9 9 (cr=35 pr=0 pw=0 time=57 us)(object id 21849934
```

FIG. 9A

```
select account_id, name
from
(select /*+ ordered use_hash(t2) */ t1.joinkey
from
(select rowid as joinkey
from sales.account
where organization_id = '00D300000000XXX'
and created_date > to_date('2009-04-20 00:00:00')) t1,
(select rowid as joinkey
from sales.account
where organization_id = '00D300000000XXX'
and owner = '005300000000XXX') t2
where t1.joinkey = t2.joinkey
) ind, sales.account t
where t.rowid = ind.joinkey
and t.organization_id = '00D300000000XXX' call     count     cpu      elapsed   disk    query    current    rows
------  -------  -------   --------  ------  -------  --------- --------
Parse      1      0.00       0.00      0       0         0          0
Execute    1      0.00       0.00      0       0         0          0
Fetch      2      0.00       0.00      0       48        0          3
------  -------  -------   --------  ------  -------  --------- --------
total      4      0.00       0.00      0       48        0          3

Misses in library cache during parse: 1
Optimizer mode: ALL_ROWS
Parsing user id: 106
Rows     Row Source Operation
-------  ---------------------------------------------------
      3   NESTED LOOPS  (cr=48 pr=0 pw=0 time=3021 us)
      3    HASH JOIN  (cr=45 pr=0 pw=0 time=3019 us)
   3342     PARTITION HASH SINGLE PARTITION: 9 9 (cr=34 pr=0 pw=0 time=3410 us)
   3342      INDEX RANGE SCAN IEACCOUNT_CREATED PARTITION: 9 9 (cr=34 pr=0 pw=0 time=60 us)(object id 21849934)
   2285     PARTITION HASH SINGLE PARTITION: 9 9 (cr=11 pr=0 pw=0 time=2314 us)
   2285      INDEX RANGE SCAN IEACCOUNT_OWNER PARTITION: 9 9 (cr=11 pr=0 pw=0 time=25 us)(object id 21849769)
      3    TABLE ACCESS BY USER ROWID ACCOUNT PARTITION: 9 9 (cr=3 pr=0 pw=0 time=35 us)
```

FIG. 9B

METHODS AND SYSTEMS FOR JOINING INDEXES FOR QUERY OPTIMIZATION IN A MULTI-TENANT DATABASE

CROSS-REFERENCE TO RELATED APPLICATIONS

This United States continuation patent application is related to, and claims priority to U.S. patent application Ser. No. 15/212,115 filed Jul. 15, 2016, entitled "METHODS AND SYSTEMS FOR JOINING INDEXES FOR QUERY OPTIMIZATION IN A MULTI-TENANT DATABASE," the entire contents of which are incorporated herein by reference; and is further related to, and claims priority to U.S. patent application Ser. No. 14/222,091 filed Mar. 21, 2014, entitled "METHODS AND SYSTEMS FOR JOINING INDEXES FOR QUERY OPTIMIZATION IN A MULTI-TENANT DATABASE," now U.S. Pat. No. 9,405,797, issued Aug. 2, 2016, the entire contents of which are incorporated herein by reference; and is further related to, and claims priority to U.S. patent application Ser. No. 12/887,367 filed Sep. 21, 2010, entitled "METHODS AND SYSTEMS FOR JOINING INDEXES FOR QUERY OPTIMIZATION IN A MULTI-TENANT DATABASE," now U.S. Pat. No. 8,706,715, issued Apr. 22, 2014, the entire contents of which are incorporated herein by reference; and is further related to, and claims priority to U.S. Provisional Patent Application No. 61/248,813 filed Oct. 5, 2009, entitled "METHODS AND SYSTEMS FOR JOINING INDEXES FOR QUERY OPTIMIZATION IN A MULTI-TENANT DATABASE," the entire contents of which are incorporated herein by reference. The present application is also related to U.S. Pat. No. 7,529,728 issued May 5, 2009, entitled "QUERY OPTIMIZATION IN A MULTI-TENANT DATABASE SYSTEM," the entire disclosure of which is incorporated by reference for all purposes, and is further related to U.S. Pat. No. 7,779,039 issued Aug. 17, 2010, entitled "CUSTOM ENTITIES AND FIELDS IN A MULTI-TENANT DATABASE SYSTEM," the entire disclosure of which is incorporated by reference for all purposes.

BACKGROUND

The implementations disclosed herein relate generally to database systems and more particularly to query optimization systems and methods for use with multi-tenant database systems ("MTS").

In order to access, retrieve, and process stored data in a database system, a query is generated, automatically or manually, in accordance with the application program interface protocol for the database. In the case of a relational database, the standard protocol is structured query language ("SQL"). SQL is used both for interactive queries to access data in the database and for gathering data and metadata, including statistics. The data access path may determine the order in which tables are retrieved—in the case of table joins, the data access path can have a profound impact on overall query performance. When the data access path is efficient, the amount of data that must be read from disk and the number of required disk accesses are minimized, thus improving overall performance (particularly where disk access is a slow operation). The efficiency of the data access path underlying the actual query is dependent in part on the size and complexity of the data structure scheme of the database and in part on the query logic used.

Accordingly, it is desirable to provide systems and methods for providing more efficient database queries.

SUMMARY

The implementations provide methods and systems for providing more efficient database queries for a database system. These method and system embodiments can enable greater contextual knowledge about the types and use of data in tables in a relational database to be employed to improve query efficiency. By employing contextual information, embodiments can provide more efficient database queries and/or make recommendations to a query optimizer of a database system to improve its operation based upon knowledge of the data and/or application gathered. Embodiments can be useful in providing more efficient query performance in a multi-tenant database system.

Some embodiments comprise receiving at a network interface of a server in a multi-tenant database system an original query transmitted to the multi-tenant database system by a user associated with a tenant, wherein the original query is associated with data accessible by the tenant, and wherein the multi-tenant database system includes at least a first index and a second index. Metadata associated with the data is retrieved, wherein at least a portion of the data is stored in a common table within the multi-tenant database system. A tenant-selective query syntax is determined by analyzing at least one of metadata generated from information about the tenant or metadata generated from the data accessible by the tenant. An improved query is then generated using the query syntax, wherein the improved query is based at least in part upon the original query and a result of a join between a first number of rows associated with the first index and a second number of rows associated with the second index.

Some embodiments comprise receiving at a network interface of a server in a multi-tenant database system an original query transmitted to the multi-tenant database system by a user associated with a tenant, wherein the original query is associated with data accessible by the tenant, and wherein the multi-tenant database system includes at least a first index and a second index. Metadata associated with the data is retrieved, wherein at least a portion of the data accessible by the tenant is stored in a common table within the multi-tenant database system. A first index column is scanned to identify a first set of rows, wherein the first index column is selected based on the original query. A second index column is scanned to identify a second set of rows, wherein the second index column is selected based on the original query. An intersection of the first set of rows and the second set of rows is determined, so as to identify a third set of rows. A query path is determined by analyzing at least one of the group consisting of metadata generated from information about the tenant and metadata generated from the data accessible by the tenant. An improved query is then generated using the query syntax, wherein the improved query is based at least in part upon the original query and the third set of rows.

Some embodiments comprise a computer-readable medium encoded with instructions for performing the above-described operations and variations thereof.

Some embodiments comprise a system comprising a process, a network interface, and computer-readable medium encoded with instructions for performing the above-described operations and variations thereof.

Reference to the remaining portions of the specification, including the drawings and claims, will realize other features and advantages of the implementations. Further features and advantages of the implementations, as well as the structure and operation of various embodiments, are described in detail below with respect to the accompanying drawings. In the drawings, like reference numbers indicate identical or functionally similar elements.

BRIEF DESCRIPTION OF THE DRAWINGS

FIGS. 9A-9B show an output (tkprof) demonstrating the performance gains of an index join according to one embodiment.

DETAILED DESCRIPTION

Query Optimization Overview

Figure 1:
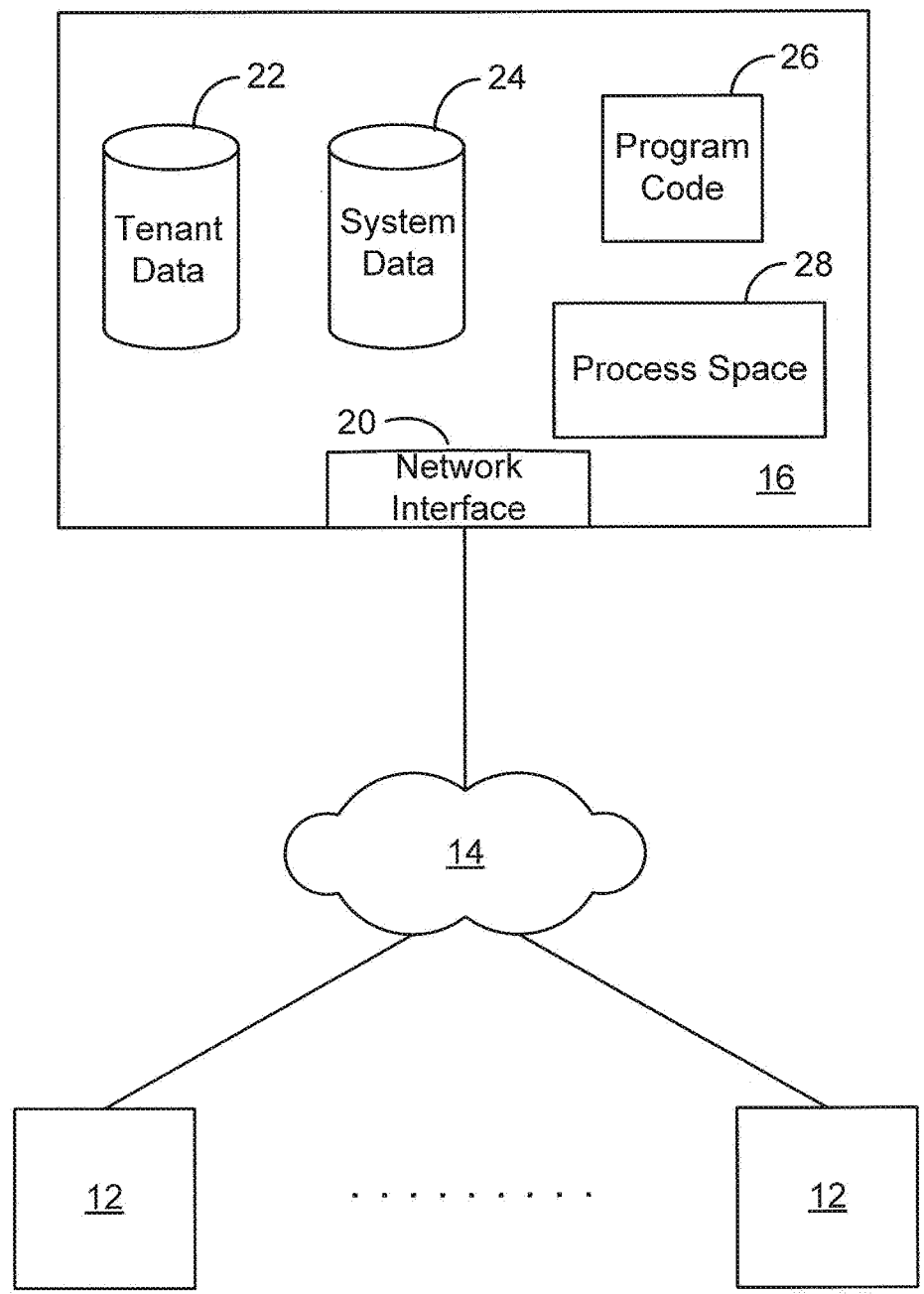
FIG. 1 is a schematic illustrating an environment including a MTS.

Conventionally, query optimizers can be used on any database, such as a relational database provided by Oracle™, a company with headquarters in Redwood Shores, Calif. Such query optimizers work generally as follows: for each table, column, or index, metadata (e.g., aggregate statistics) are gathered (typically periodically or on demand by a database administrator). The statistics typically include the total number of rows, average size of rows, total number of distinct values in a column or index (an index can span multiple columns), histograms of column values (which place a range of values into buckets), etc. The optimizer then uses these statistics and other metadata to decide among a possible set of query paths (a.k.a. data access paths) in order to assemble an efficient query.

In general, one goal of a query optimizer is to minimize the amount of data that must be read from disk (e.g., because disk access may be a slow operation). The optimizer therefore typically chooses tables or columns that will create the most "selective" filters for a query, wherein a "filter" is defined as a single conditional term in the WHERE clause of a SQL statement. Ideally, each filter yields the fewest rows when looking for particular values in the chosen tables or columns. For a multi-filter query, the optimizer may also choose a particular order in which to evaluate the filters; for example, the filters may be evaluated in order from most selective to least selective, since this will most efficiently reduce the overall size of the data set upon which the query engine must operate. For instance, if a filter evaluates two columns of a single table, and both columns are indexed, then the optimizer will select one index as the starting point from which to access the data set—in this case, the optimizer will typically use the index that has the highest number of distinct values (i.e., the highest cardinality) because, statistically, for any given filter value, a smaller number of rows are expected to be returned. Conventional optimizers assume that there is a relatively even distribution of data with respect to each unique filter value, which leads to the presumption that the high-cardinality index is likely to yield a smaller number of rows for a given filter (as would be the case for a filter looking for values equal to the filter value).

However, such conventional query optimizers may fail when presented with situations where the optimizer is unaware that data may have different characteristics for specific columns, for example, where data is not homogeneously distributed throughout the database. In the case of table joins, the optimizer's decisions may be even more important—deciding which table to retrieve first can have a profound impact on overall query performance. Here again, by using system-wide aggregate statistics or other system-wide metadata, the optimizer might choose a query path that is incorrect or inefficient when confronted with data that does not conform to the typical distribution of the database as a whole (as may be statistically determined).

In particular, implementation of a query optimizer within the environment of a MTS presents novel challenges. For example, a MTS, such as the salesforce.com service, may utilize a multi-tenant architecture wherein unrelated organizations (i.e., tenants) can share database resources in a single logical database. The database entities, or tables, themselves may be shared between tenants—each entity in the data model typically contains an organization_id column or similar column that identifies the data items associated with each tenant. All queries and data manipulation are performed in the context of a tenant-specific filter on the organization_id column or similar column to ensure proper security and enable the creation of virtual private databases. Since entities are shared, however, the provision of features like query optimization presents nontrivial issues. Each tenant of the MTS may have its own unique patterns of data distribution and metadata, so query optimization is ideally highly customizable on a tenant-specific basis.

In various embodiments, techniques for improving queries for databases can overcome the deficiencies of conventional database query optimizers, which are inefficient in the MTS context because they fail to account for the particular characteristics of each tenant's data in a MTS organization. For example, while one tenant's data may include numerous short records having only one or two indexable fields, another tenant's data may include fewer, longer records having numerous indexable fields. Additionally, embodiments can provide more efficient queries that are custom entity- and/or custom field-aware, to meet the requirements of tenants that create such custom entities or custom fields, as described in U.S. Pat. No. 7,779,039, incorporated by reference herein in its entirety.

In addition to structural (schema) differences, the distribution of data among different tenants in a MTS may be quite different, even when tenant schemas are similar. Modern relational databases rely on statistics-based query optimizers that make decisions about the best way to answer a query given accurate table-level and column-level statistics that are gathered periodically. Since existing relational databases are not multi-tenant-aware, however, these statistics are typically not specific to any one tenant, but are in fact an aggregate or average of all tenants. This approach can lead to incorrect assumptions about any one tenant, which may result in inefficient query syntax.

Definitions

Each database can generally be viewed as a collection of objects, such as a set of logical tables, containing data fitted into predefined categories. A "table," one representation of a data object, is used herein to simplify the conceptual description of objects and custom objects in the present disclosure. It should be understood that "table" and "object" and "entity" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc.

As used herein, the term multi-tenant database system ("MTS") refers to those systems in which various elements of hardware and software of the database system may be shared between one or more customers. For example, a given application server may simultaneously process requests for a great number of customers, and a given database table may store rows for a potentially much greater number of customers. In some MTS embodiments, standard entity tables might be provided. For CRM database applications, such standard entities might include tables for relevant data, such as Account, Contact, Lead and Opportunity, each containing predefined fields.

As used herein, the term contextual information refers broadly to any information about the distribution or allocation of information in an underlying database, or the effects of specific operations on the data, including permissions by one or more tenants to access specific data or to perform specific operations in a MTS.

As used herein, the term tenant-level statistics is broadly defined as statistical quantities that are kept on a per-tenant basis, although they may mirror the underlying relational database statistics in many ways (for example, in one aspect they track the total number of distinct values for indexed columns).

As used herein the term denormalized index table is defined as any indexed tables where instead of adding an Oracle-type index on a column of the regular multi-tenant wide table, the contents of that column are copied into a new separate narrow table, prior to adding Oracle-type indices on the narrow table.

Multi-Tenant Database System (MTS) Overview

FIG. 1 illustrates an environment wherein a MTS might be used. As illustrated in FIG. 1 (and in more detail in FIG. 2) any user systems 12 might interact via a network 14 with a MTS 16. The users of those user systems 12 might be users in differing capacities and the capacity of a particular user system 12 might be entirely determined by the current user. For example, when a salesperson is using a particular user system 12 to interact with MTS 16, that user system has the capacities allotted to that salesperson. However, while an administrator is using that user system to interact with MTS 16, that user system has the capacities allotted to that administrator.

Network 14 can be a local area network ("LAN"), wide area network ("WAN"), wireless network, point-to-point network, star network, token ring network, hub network, or other configuration. As the most common type of network in current use is a Transfer Control Protocol and Internet Protocol ("TCP/IP") network such as the global internetwork of networks often referred to as the "Internet" with a capital "I," that will be used in many of the examples herein, but it should be understood that the networks that the system might use are not so limited, although TCP/IP is the currently preferred protocol.

User systems 12 might communicate with MTS 16 using TCP/IP and, at a higher network level, use other common Internet protocols to communicate, such as Hypertext Transfer Protocol ("HTTP"), file transfer protocol ("FTP"), Andrew File System ("AFS"), wireless application protocol ("WAP"), etc. As an example, where HTTP is used, user system 12 might include a HTTP client commonly referred to as a "browser" for sending and receiving HTTP messages from a HTTP server at MTS 16. Such a HTTP server might be implemented as the sole network interface between MTS 16 and network 14, but other techniques might be used as well or instead. In some embodiments, the interface between MTS 16 and network 14 includes load-balancing functionality, such as round-robin HTTP request distributors to balance loads and distribute incoming HTTP requests evenly over a plurality of HTTP servers. Preferably, each of the plurality of HTTP servers has access to the MTS's data, at least as for the users that are accessing that server.

In aspects, the system shown in FIG. 1 implements a web-based customer relationship management ("CRM") system. For example, in one aspect, MTS 16 can include application servers configured to implement and execute CRM software applications as well as provide related data, program code, forms, web pages and other information to and from user systems 12 and to store to, and retrieve from, a database system related data, objects and web page content. With a MTS, tenant data is preferably arranged so that data of one tenant is kept separate from that of other tenants so that one tenant does not have access to another's data, unless such data is expressly shared.

One arrangement for elements of MTS 16 is shown in FIG. 1, including a network interface 20, storage 22 for tenant data, storage 24 for system data accessible to MTS 16 and possibly multiple tenants, program code 26 for implementing various functions of MTS 16, and a process space 28 for executing MTS system processes and tenant-specific processes, such as running applications as part of an application service.

Some elements in the system shown in FIG. 1 include conventional, well-known elements that need not be explained in detail here. For example, each user system 12 could include a desktop personal computer, workstation, laptop, personal digital assistant ("PDA"), cell phone, or any WAP-enabled device or any other computing device capable of interfacing directly or indirectly to the Internet or other network connection. User system 12 typically runs a HTTP client, e.g., a browsing program, such as Microsoft's Internet Explorer® browser, Mozilla's Firefox® browser, Netscape's Navigator® browser, Apple's Safari® browser, the Opera© browser, or a WAP-enabled browser in the case of a cell phone, PDA, or other wireless device, or the like, allowing a user (e.g., subscriber of a CRM system) of user system 12 to access, process and view information and pages available to it from MTS 16 over network 14. Each user system 12 also typically includes one or more user interface devices, such as a keyboard, a mouse, touch screen, pen or the like, for interacting with a graphical user interface ("GUI") provided by the browser on a display (e.g., monitor screen, LCD display, etc.) in conjunction with pages, forms and other information provided by MTS 16 or other systems or servers. As discussed above, the system is suitable for use with the Internet, which refers to a specific global internetwork of networks. However, it should be understood that other networks can be used instead of the Internet, such as an intranet, an extranet, a virtual private network ("VPN"), a non-TCP/IP-based network, any LAN or WAN or the like.

According to one embodiment, each user system 12 and all of its components are operator configurable using applications, such as a browser, including program code run using a central processing unit such as an Intel Pentium® processor or the like. Similarly, MTS 16 (and additional instances of MTS's, where more than one is present) and all of their components might be operator configurable using application(s) including program code run using a central processing unit such as an Intel Pentium® processor or the like, or multiple processor units. Program code for operating and configuring MTS 16 to intercommunicate and to process web pages and other data and media content as described herein is preferably downloaded and stored on a hard disk, but the entire program code, or portions thereof, may also be stored in any other volatile or non-volatile memory medium or device as is well known, such as a ROM or RAM, or provided on any media capable of storing program code, such as a compact disk ("CD") medium, digital versatile disk ("DVD") medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, WAP, Ethernet, etc.) as are well known. It will also be appreciated that program code for implementing aspects of the system can be implemented in any programming language that can be executed on a server or server system such as, for example, in C, C++, HTML, Java, JavaScript, WML, any other scripting language, such as VBScript and many other programming languages as are well known.

It should also be understood that each user system 12 may include differing elements, For example, one user system 12 might include a user's personal workstation running Microsoft's Internet Explorer® browser while connected to MTS 16 by VPN, another user system 12 might include a thin-client netbook (e.g., Asus Eee PC®) running the Opera© browser while connected to MTS 16 through an extranet, and another user system 12 might include a PDA running a WAP-enabled browser while connected to MTS 16 over third-party cellular networks.

According to one embodiment, each MTS 16 is configured to provide web pages, forms, data and media content to user systems 12 to support the access by user systems 12 as tenants of MTS 16. As such, MTS 16 provides security mechanisms to keep each tenant's data separate unless the data is shared. If more than one MTS 16 is used, they may be located in close proximity to one another (e.g., in a server farm located in a single building or campus), or they may be distributed at locations remote from one another (e.g., one or more servers located in city A and one or more servers located in city B). Each MTS 16 may include one or more logically and/or physically connected servers distributed locally or across one or more geographic locations. Additionally, the term "server" is meant to include a computer system, including processing hardware and process space(s), and an associated storage system and database application (e.g., relational database management system ("RDBMS")), as is well known in the art. It should also be understood that "server system" and "server" are often used interchangeably herein. Similarly, the databases described herein can be implemented as single databases, a distributed database, a collection of distributed databases, a database with redundant online or offline backups or other redundancies, etc., and might include a distributed database or storage network and associated processing intelligence.

Figure 2:
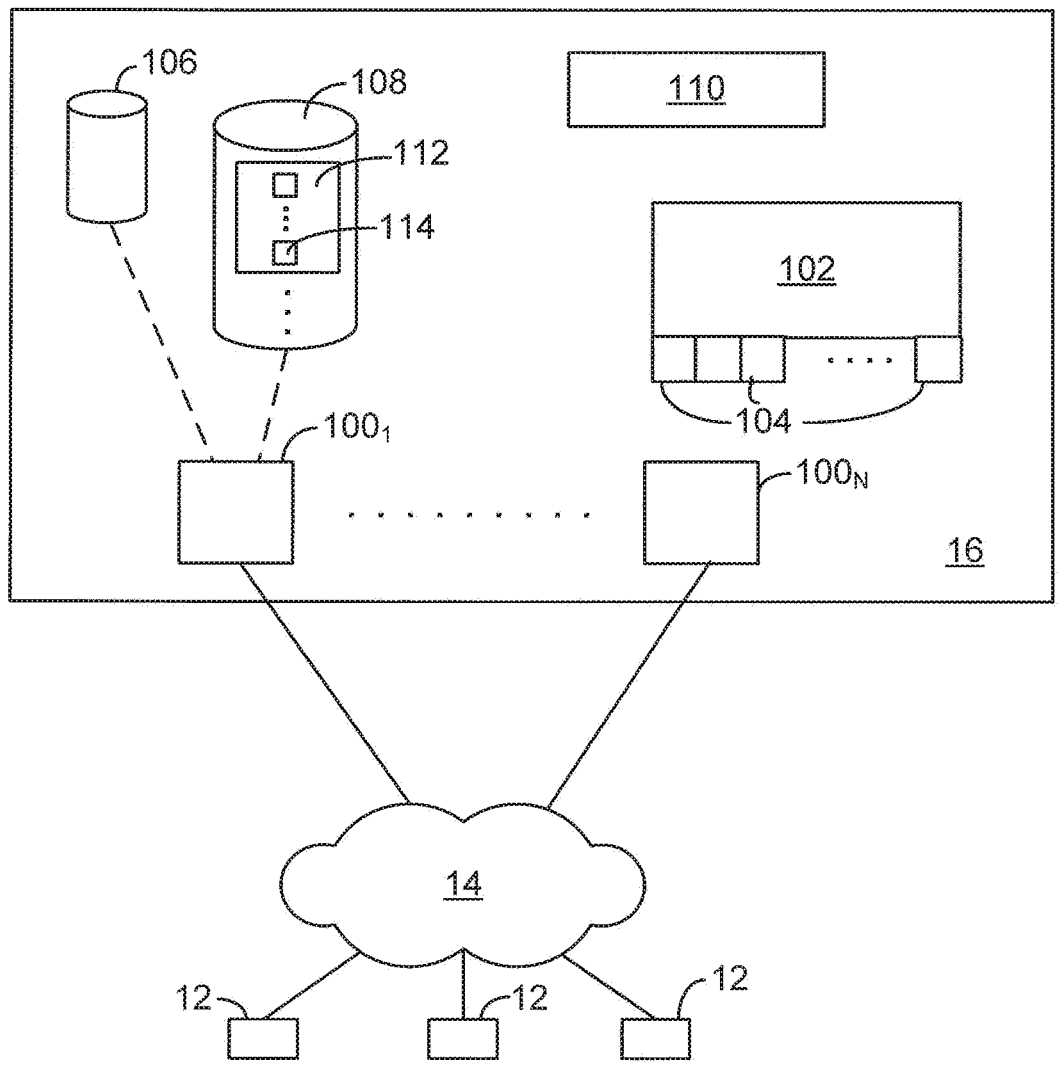
FIG. 2 is a schematic illustrating elements of a MTS and interconnections therein in an embodiment.

FIG. 2 illustrates elements of MTS 16 and various interconnections in an exemplary embodiment. In this example, the network interface is implemented as one or more HTTP application servers 100. Also shown is system process space 102 including individual tenant process space(s) 104, a system database 106, tenant database(s) 108, and a tenant management process space 110. Tenant database 108 might be divided into individual tenant storage areas 112, which can be either a physical arrangement or a logical arrangement. Within each tenant storage area 112, a user storage 114 might similarly be allocated for each user.

It should also be understood that each application server 100 may be communicably coupled to database systems, e.g., system database 106 and tenant database(s) 108, via a different network connection. For example, one application server 100$_1$ might be coupled via the Internet 14, another application server 100$_{N-1}$ might be coupled via a direct network link, and another application server 100$_N$ might be coupled by yet a different network connection. TCP/IP is the currently preferred protocol for communicating between application servers 100 and the database system, however, it will be apparent to one skilled in the art that other transport protocols may be used to optimize the system depending on the network interconnect used.

In aspects, each application server 100 is configured to handle requests for any user/organization. Because it is desirable to be able to add and remove application servers from the server pool at any time for any reason, there is preferably no server affinity for a user and/or organization to a specific application server 100. In one embodiment, therefore, an interface system (not shown) implementing a load-balancing function (e.g., an F5 Big-IP load balancer) is communicably coupled between the application servers 100 and the user systems 30 to distribute requests to the application servers 100. In one aspect, the load balancer uses a least connections algorithm to route user requests to the application servers 100. Other examples of load-balancing algorithms, such as round robin and observed response time, also can be used. For example, in certain aspects, three consecutive requests from the same user could hit three different servers, and three requests from different users could hit the same server. In this manner, MTS 16 is multi-tenant, wherein MTS 16 handles storage of different objects and data across disparate users and organizations.

As an example of storage, one tenant might be a company that employs a sales force where each user (e.g., a salesperson) uses MTS 16 to manage their sales process. Thus, a user might maintain contact data, leads data, customer follow-up data, performance data, goals and progress data, etc., all applicable to that user's personal sales process (e.g., in tenant database 108). In one MTS arrangement, since all of this data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's sales data might be separate from other users' sales data regardless of the employers of each user, some data might be organization-wide data shared or accessible by a plurality of users or all of the sales force for a given organization that is a tenant. Thus, there might be some data structures managed by MTS 16 that are allocated at the tenant level while other data structures might be managed at the user level. Because an MTS might support multiple tenants including possible competitors, the MTS, in one implementation, has security protocols that keep data, applications, and application use separate. Also, because many tenants will opt for access to an MTS rather than maintain their own system, redundancy, up-time and backup are more critical functions and need to be implemented in the MTS.

In addition to user-specific data and tenant-specific data, MTS 16 might also maintain system-level data usable by multiple tenants or other data. Such system-level data might include industry reports, news, postings, and the like that are sharable among tenants.

In certain aspects, user systems 30 communicate with application servers 100 to request and update system-level and tenant-level data from MTS 16; this may require one or more queries to system database 106 and/or tenant database 108. MTS 16 (e.g., an application server 100 in MTS 16) automatically generates one or more SQL statements (a SQL query) designed to access the desired information.

Figure 3:
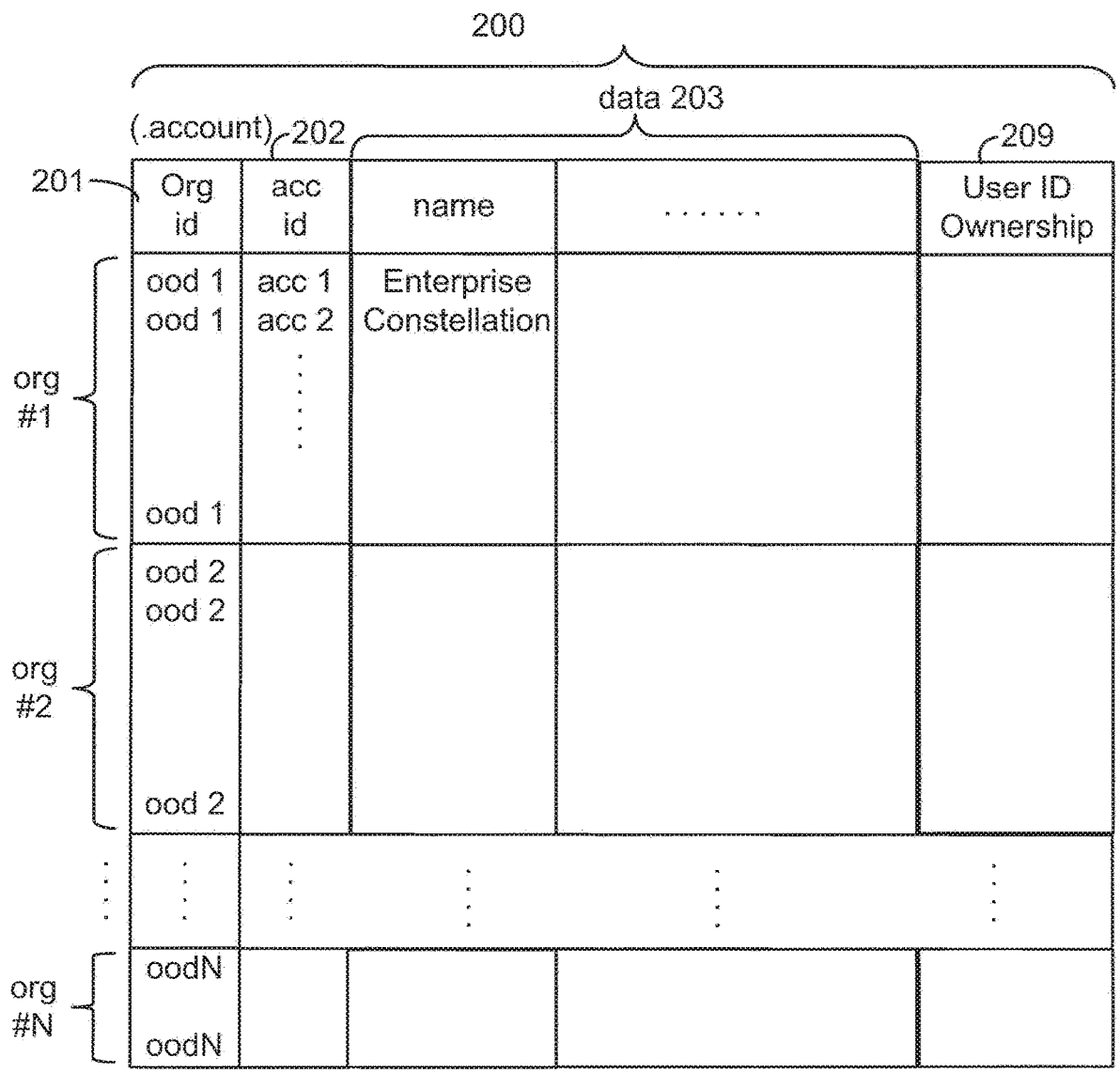
FIG. 3 is a schematic illustrating an example of objects represented as a main table in an embodiment.

FIG. 3 illustrates an example of an object represented as a main table 200 that holds data items for multiple tenants. In the particular example shown in FIG. 3, the main table 200 (.account) represents a standard Account entity that holds account information for multiple organizations. As shown, main table 200 includes an organization ID column 201 and an account ID column 202 that acts as the primary key for main table 200. For example, for organization #1, column 201 shows that Org ID="ood 1," and two account IDs are listed ("ood 1" and "ood 2"). Main table 200 also includes a plurality of data columns 203 containing other information about each row. For example, for account ID "ood1," information is stored about the account name (i.e., "Enterprise"). Main table 200 may also include column 209 that stores the user ID of the user that owns or created the specific account that is stored in that row.

The organization ID column 201 is provided to distinguish among organizations using the MTS. As shown, N different organizations have data stored in main table 200. In an exemplary embodiment, the organization IDs in column 201 are defined as Char(15), but may be defined as other data types. In one embodiment, the first 3 characters of the organization ID is set to a predefined prefix, such as "ood", although another subset of characters in the organization ID may be used to hold such a prefix if desired.

In the particular example of FIG. 3, where the table represents a standard entity, data columns 203 are predefined data columns, or standard fields, that are provided to the various organizations that might use the table. In the Account entity example described above, such standard fields might include a name column, a site column, a number of employees column and others as would be useful for storing account-related information. Each of the data columns 203 is preferably defined to store a single data type per column.

Optimizing Queries for Use in a MTS Environment

In one embodiment, a MTS includes one of the data columns 203 that is shared by many tenants and that has a high cardinality (e.g., large number of distinct values for most tenants), but a small number of distinct values for a specific tenant, e.g. org #2. For this latter tenant, a typical query optimizer may choose to use this overall high-cardinality column in error because it is unaware that the column is not particularly selective for this specific tenant.

In the case of table joins, the optimizer's decisions may be even more important, since deciding which table to retrieve first can have a profound impact on overall query performance. Here again, by using system-wide aggregate statistics or other metadata, a conventional query optimizer might choose a query syntax that is incorrect or inefficient for a tenant who does not conform to the "normal" average of the entire database.

As a specific example of the importance of table joins, consider a private sharing paradigm that allows groups defined within one or more particular tenants to share information only among members of that group provided in certain embodiments. This private sharing feature allows a specific list of users to have access to privileged data, for example, such as specific accounts or opportunities. In such embodiments, a sharing filter (which can take the form of an additional join or a nested sub-query) provides data security by restricting the user's view to data to which the user has been given access. It is noteworthy that not all tenants will elect to enable private sharing for their implementations. Some tenants may elect to adopt a public sharing paradigm instead. In a public sharing implementation, each user associated with a tenant sees every data row within the tenant's organization. In some embodiments, shared tables such as Many-to-Many ("MTM") physical tables (e.g. table 400 of FIG. 4) are populated for private sharing implementations only and are joined in queries made by organizations using private sharing.

Figure 4:
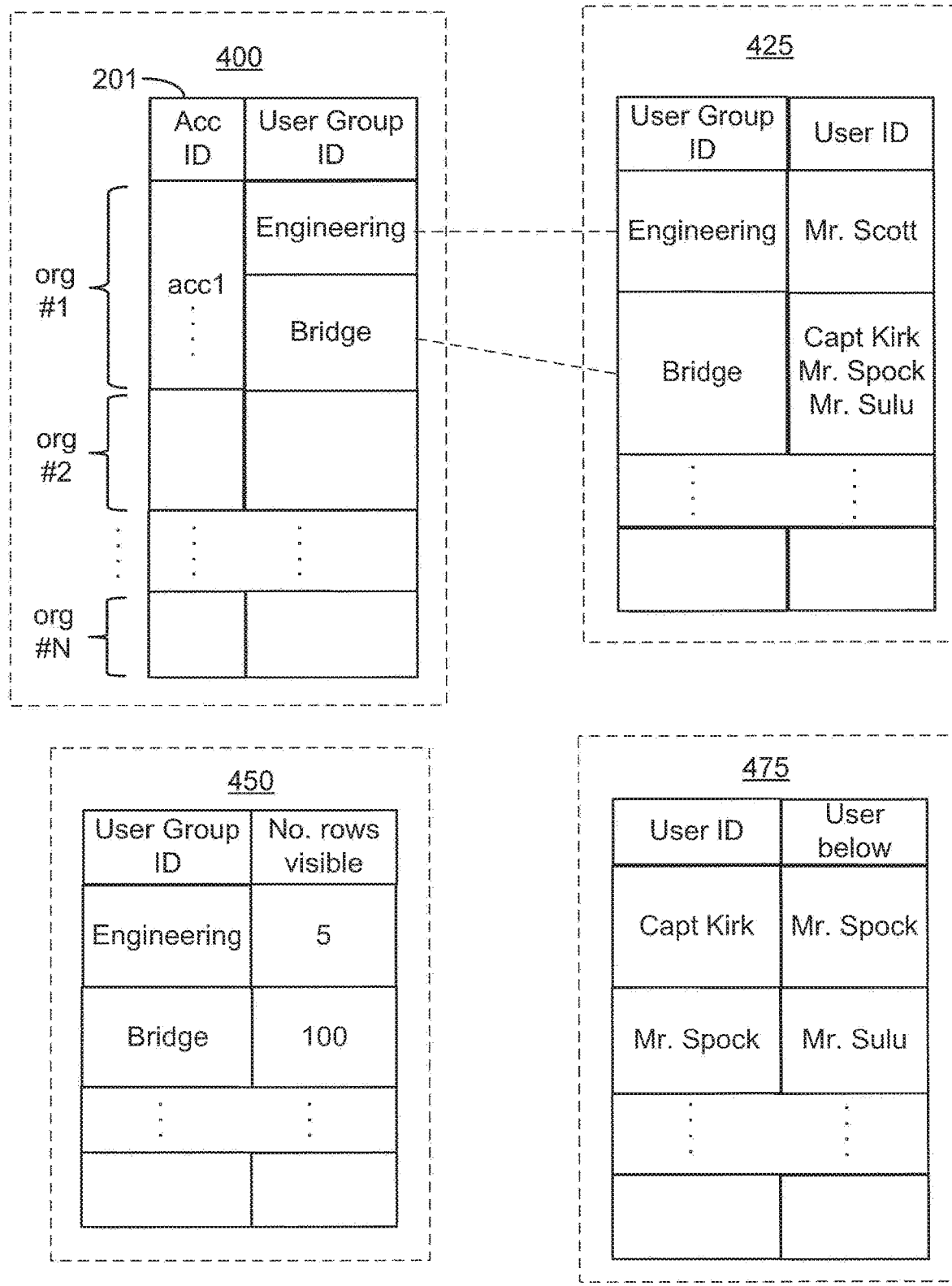
FIG. 4 is a schematic illustrating an example physical table capable of sharing information in an embodiment.

Table 400 of FIG. 4 illustrates one embodiment of a storage mechanism for storing information by a tenant using a private sharing paradigm. It is noteworthy that table 400 is merely an illustrative example of one private sharing implementation and is not intended to limit embodiments to sharing only specific types or quantities of information. The MTM table 400 specifies which user or group of users has access to particular entity rows. In the example MTM table 400 illustrated by FIG. 4, a particular organization assigned account ID (i.e., "acc id") "ood1" has two user group IDs: "Engineering" and "Bridge." When displaying a list of all rows that the current user can see, one can choose between accessing this MTM table 400 from the data access perspective of the user (i.e., Engineering or Bridge) or the data access perspective of the entity (i.e., ood1) of the relationship.

If a given filter is highly selective for a particular entity (e.g., a filter on Account for a particular account name, such as "Constellation Corp."), it may be more efficient to begin the query path with that filter. If, however, the filter is not sufficiently selective for the entity, but the current user has access to only a small amount of data (e.g., where a user only has access to data associated with a particular customer account, or where a user can only access business development opportunities valued at or below a certain amount), then rows are ideally accessed in the MTM table 400 through a user filter. In the above example, a conventional query optimizer's native statistical methods may be insufficient to make this determination, since the native statistics are likely aggregated across multiple tenants and may not provide context into the current tenant's data. In this case, embodiments implementing private sharing provide mechanisms and methods for improving the original query prior to the query being submitted to the database.

It is noteworthy that, because of the wide range of business types, industries, and sizes potentially served by a MTS, the likelihood of data "skew" is greatly increased. The statistical profile of the largest and most complex tenants is likely to look very different from that of small- or medium-sized customers.

Optimizing Queries by Using Tenant-Level Metadata

In embodiments implementing database systems provided by Oracle Inc., for example, override mechanisms are provided that can override the Oracle native query optimizer. The query "Hints" feature enables more efficient query syntax. For instance, a more efficient SQL statement might adjust the order of table joins, or select particular non-default indices for use (rather than letting the optimizer choose automatically). Another mechanism for controlling the query syntax is to re-write the query using equivalent but different SQL syntax. For instance, a single flat SQL statement can be re-written using a nested SELECT in the FROM clause of the outer query. In some cases, joins and semi-joins may be inter-changeable. Anti-joins can be written using the NOT EXISTS operator, etc. All of these are examples of ways in which a programmatic SQL generator can alter the behavior of the query optimizer native to an underlying database by using contextual knowledge to change the query syntax.

In certain aspects, a query optimizer native to a RDBMS, such as the query optimizer provided with the RDBMS by Oracle, may be configured or "tuned" by supplying appropriate "hints" to the native query optimizer. In one embodiment, when SQL is generated programmatically by the MTS, tenant-level statistics and other tenant-level metadata are consulted and a decision is made as to the syntax of the query. In one embodiment, tenant-level statistics may be stored in tables in tenant database storage areas 112 (e.g., tables stored in user storage areas 114 of database 108). Similarly, for important application functionality (e.g., sharing), the MTS tracks and stores important statistics, such as the approximate number of rows to which each user has access. Then, when a query for a specific tenant including filters on shared tables is received, the dynamically generated SQL includes the appropriate hints and structure to generate a query syntax optimized for the specific tenant.

In one aspect, user-specific and tenant-specific metadata information and data are tracked (e.g., relevant information and metadata stored to separate user-level and tenant-level data tables) in order to make choices about query paths. These techniques can be especially beneficial for list-style queries such as reports. In one embodiment, evaluation of a sharing paradigm controls which users can see which records. These embodiments can distinguish between users that can see many rows in an organization (e.g., bosses) versus users who can see very few rows (e.g., lower-level employees). In another embodiment, query filters are selected based upon a determination of which filters are the most selective for fields that contain enumerated lists of values (e.g., list of status values for an account, list of industries, list of states, etc.). In a further embodiment, the joining and tracking of specialized tables is made more efficient by using tenant-level statistics. In a yet further embodiment, a sharing paradigm is combined with a proper choice of filters, e.g. which filter should lead the query and how should the other filters be organized in a query syntax in order to improve the efficiency of the query. In a still yet further embodiment, tenant-specific information may be used to improve a query. For example, if one field is expected to contain non-null values for one specific tenant but not necessarily for all tenants, embodiments can take advantage of that fact by generating appropriately-tailored SQL statements when the specific tenant's users access data through a filter on this field.

Optimizing Queries for a Sharing Paradigm

In some embodiments, for each user in the system, an approximate count of the number of rows that the user can see is tracked for each entity type or organization that has a sharing paradigm. This number of rows (as a percentage of the total number of entity rows for that organization) is used as a decision point by embodiments selecting between two different query paths. It has been determined empirically that users who can see most of the entity rows (e.g., bosses) benefit from a certain query syntax, whereas users who can see a small percentage of the entity rows (e.g., lower-level employees) benefit from a different query syntax. Conventional approaches are not able to select between the two query paths without having an entirely different query provided via a programmatic decision.

In some embodiments, metadata (e.g., number of rows accessible per tenant or per user, or other metadata) is generated from data in multi-tenant tables and stored to tenant-level tables or user-level tables in database 108. For example, a tenant-level metadata table might be stored to a tenant storage area 112, and a user-level table might be stored to a user storage area 114 (as shown in FIG. 1). In one aspect, a metadata generator processes multi-tenant tables and produces tenant- and user-level metadata tables, such as the tenant-level metadata table 450 shown in FIG. 4. Appropriate tables are retrieved and processed when preparing more efficient SQL queries. In other aspects, flags or tags may be implemented in the MTS tables to distinguish users and tenants.

The number of rows that are accessible by a tenant or user may be calculated based on the ownership of a row, which is tracked in column 209 of table 200. The ownership information can be entered when the row (e.g. account) is created or by other means and/or at other times depending upon implementation specific details. From this ownership data, metadata tables may be permanently created or calculated dynamically upon login of a user. Using such metadata, a user query can be optimized for efficiency prior to submission to an underlying database manager. If a user can see few rows, then a query may be optimized for efficiency by structuring the query to retrieve all of the data in those rows and then apply any desired filters to the data in the selected rows. For example, consider a query of the form: "Show me all accounts that I can see" in a private account sharing paradigm. An example of a data model for sharing appears in FIG. 4 (table 400 is the shared table, table 425 is the user/group "blowout" table that describes which users are contained in a group, table 475 describes which users are above a particular user in the role hierarchy, and table 450 stores metadata about the users). According to one aspect, for a "lower-level employee" user, it is typically most advantageous to join these tables starting from the right, filtering on users_id to form a temporary result of the rows that can be seen. Because the user cannot see many rows, this will likely yield a relatively efficient query. An example query follows:

```
select a.name "ACCOUNT.NAME"
from sales.account a,
(select distinct s.account_id
    from core.ug_blowout b, sales.acc_share s
    where s.organization_id = ?
    and b.organization_id = ?
    and b.users_id = ?
    and s.ug_id = b.ug_id
    and s.acc_access_level > 0) t,
    core.users u
```

```
            where (t.account_id = a.account_id)
            and (u.users_id = a.owner)
            and (a.deleted = '0')
            and (a.organization_id = ?)
            and (u.organization_id = ?))
```

Conversely for a "boss" user who can see most of the entity records in the organization, data may be accessed in a different manner, e.g. by applying a selective filter on all rows of the desired tenant. If the metadata gathered for a boss (e.g., by gathering up the owernship numbers for people beneath) indicates access to many rows, it is typically most advantageous to begin the query from the left and use a nested-loop query syntax onto the sharing table (acc_share), an example of which follows:

```
            select a.name "ACCOUNT.NAME"
            from sales.account a, core.users u
            where (u.users_id = a.owner)
            and (a.deleted = '0')
            and (a.organization_id = ?)
            and (exists (select 1
                from core.ug_blowout b,
                sales.acc_share s
              where s.organization_id = ?
              and b.organization_id = ?
              and b.users_id = ?
              and s.ug_id = b.ug_id
              and s.acc_access_level > 0
              and s.account_id = a.account_id))
            and (u.organization_id = ?)
```

Note that this query in general runs in relatively constant (reasonable) time for all users in an organization. It may not be particularly fast since it iterates through all top-level entity records, but it is suitable for a boss who can in fact see most records. The first "lower-level employee" query runs much faster for users who in fact can not see many records, but it may run much slower for bosses who can see all records. Therefore, it is desirable to determine the user type ahead of time in order to select the optimal query path.

In order to keep the metadata current, the total number and/or the percentage of rows that each and every user can access can be tracked. In one aspect, there are three ways in which a user might gain access to data in a private sharing paradigm:
 (1) Rows owned by the user or users below the user in the role hierarchy;
 (2) Rows that are shared via sharing rules to a group to which this user belongs; and
 (3) Rows that are shared via manual/team sharing to this user (possibly via a group).

In one aspect, the total number of rows for each entity type for each organization is tracked (this is useful for any of the strategies above). Also, the total number of rows owned by each user in a metadata table is tracked.

Because (1) and (2) can be important reasons for tracking why a user has access to entity records in some implementations (this might be known empirically from how organizations use the system), the information needed to calculate the number of rows a user can access, at least approximately, can be determined from the role hierarchy metadata table 475 of FIG. 4 (for example, in conjunction with metadata table 450). These metadata tables can be used to determine the number of records owned by a user or his subordinates.

Metadata related to sharing rules, such as tables 400 or 450, can also be used along with the group definition metadata, such as table 425, to calculate the total number of rows visible for a given user via sharing rules. For example, tables 400 and 425 may be joined from the right in order to determine the groups (e.g., Engineering and/or Bridge) to which a user belongs. The number of rows seen by each of these groups may then be obtained from table 450 and added together. Table 450 may be calculated from table 400 for each organization. It will be appreciated by those skilled in the art that, while these methods of determining users from metadata tables illustrated by FIG. 4 are specific to a particular tenant in a MTS, other metadata tables may be included to hold metadata for other tenants.

In one aspect, the use of metadata tables such as the metadata tables illustrated by FIG. 4 (which are generally much smaller than the actual entity tables which might have millions of rows) ensures that the calculation of visible rows may not require much time. In one aspect, the decision to use metadata tables to perform this calculation is itself cached in a user-information data structure kept by running application servers 100, e.g., with a timeout value. In this manner, even though the calculation itself may be relatively lightweight, it is only performed periodically while a user is logged in.

Besides user group ID, Table 450 could be based on a tenant, division, group or other type of identification. Thus, each one of the tables in an example embodiment illustrated by FIG. 4 may hold tenant-level, user-level, or other level metadata based on a type of identification.

In some embodiments, a single tenant can be partitioned into "sub-tenants." This enables a large entity, such as the Accounts table, to be split into many smaller ones. Users can choose to work within one division at a time. Most of the large tables in the physical data model have an index on a physical division column. Whenever a user filters their top-level operation on this division field, this "predicate," is "pushed" (i.e., carried forward) not only into the top-level entity but also into any adjunct tables (most notably the custom field and sharing tables) that are known to share this same semantic division field. This can cause the entire query to run much faster for various different types of filter predicates and users because the number of rows seen by a user performing the search is reduced to the number of rows in the division.

Optimizing Queries by Improving the Search on Columns

A typical end-user report execution includes a set of displayed columns from multiple tables along with a set of filters. A typical report might join between three and seven (or more) main tables with filtering possibly occurring on one or more of these tables. Given the number of joins, the number of predicated filters that might occur in a query can be quite high. Thus, proper selection of which columns to use to join the tables can increase efficiency significantly over conventional database query optimizers that compute selectivity based on all indices in the physical database, a method that is practically certain to succumb to data skew from uneven data distribution among tenants. In addition, certain filters, such as the sharing filter discussed above (which can take the form of an additional join or a nested sub-query), should be applied to assure that the user only sees data to which the user has been given access.

The optimization of query searches may be prioritized based on the selectivity of the filters used on the columns. In one embodiment, the column with the highest cardinality is selected to lead the query. Each filter predicate may be examined in order from the main table to adjunct tables in search of the one with the highest cardinality. The search may be only for the one with the highest cardinality; alternatively, all of the filter predicates may be put in order by degree of cardinality.

The cardinality may be tracked in any of a number of ways. In one embodiment, information about enumerated "picklist" fields (those fields that are known to contain a small list of possible values) is tracked. For example, the cardinality for each picklist data column may be tracked on a tenant, division, and/or custom entity basis. Examples of "picklist" fields include the list of priority values for a task and the list of industries for an account. These types of fields are often used as the basis of filters for executive reporting and data rollup reports. In addition to the values themselves, the approximate number of times each value appears in the actual entity table for that organization (tenant) can be tracked in the metadata. When a user sets a filter value that appears infrequently for that organization, the overall query is preferably driven from the table containing that column (possibly from an index on that column, if available). For picklist fields, the metadata tracked and stored does not need to reflect the exact number of occurrences for each value—a reasonable estimate is sufficient and may be used in embodiments. Values missing from the metadata either do not occur at all, or occur infrequently, and thus such metadata provide a good basis for a filter.

In one aspect, when a user runs a report with N filters, each filter is evaluated for expected selectivity. If, for example, the user filters on two values (e.g., "California" and "Florida") from a list of states, and it is known that these values represent, respectively, five percent (5%) and two percent (2%) of the overall rows, then the filter presumably has a seven percent (7%) selectivity. Similarly, if a Boolean field has 95% true values, then filtering on the false value appears attractive as a filter, whereas filtering on the value "Male" from a random list of people would not be very selective, since 50% reduction would not make a very good filter.

The selectivity of a sharing filter is also considered in one aspect. For a user with very little (perhaps two percent (2%)) data visibility, the sharing filter might prove to be the best starting point—in such a case, the sharing filter would lead the query path, rather than a filter on one of the main entity tables such as, e.g., Account or Contact tables.

In one aspect, other filter types may be incorporated, in addition to semantic knowledge about the application. For example, if an organization has imported all opportunities for the last three years, and a user report filters on the value "all opportunities that closed in the last week," then this is likely to represent a selective filter. The presence of custom field indices (e.g., a certain set of columns that administrators can choose to place into a B-tree indexed custom field columns) are also factored in one aspect, as will be discussed below.

In embodiments wherein modifications are made to the default query constructed by a native query optimizer, a query is only modified if it is likely that a particular starting table will yield an efficient query. All other tables would then be joined via nested loops. In some embodiments, tenant-level data decisions are based on tenant-level metadata, and user-level data decisions based on user-level metadata. Embodiments also can take into account application-level concepts such as sharing that are beyond the generic nature of the underlying RDBMS.

Optimizing Queries by Using Denormalized Data Structures

Embodiments can form a more efficient query that includes one or more references to a denormalized data structure that enables accessing names in the database stored in a name table; thereby enabling customers to build indices by copying denormalized field values into a universal indexed table and using a "reverse index" to locate a foreign key from a parent to a child foreign key table. Examples of denormalized indexes stored in universal indexed tables include the Search Name Lookup (SNL), Custom Index Value (CIV), and CFKV (Custom Foreign Key Value) tables described herein below. To take advantage of the index, an SQL query is generated or rewritten to join to the narrow table. Denormalized table techniques can provide embodiments having the advantages of: (1) selectively copying contents for one tenant but not for another tenant (thereby not wasting resources by maintaining indices for a tenant who doesn't need indexing); (2) creating indices on different columns as best suited to each tenant and updating the selection of which columns are indexed on a per-tenant basis as requirements change over time (the plethora of columns in the regular multi-tenant wide table make it impractical to add indices for each and every one of them); (3) enabling querying, filtering, and sorting of different data types (in the CIV table, there are separate Oracle-type indices for each of string, number, and date contents). Embodiments using denormalized data structures may create one or more the special-purpose tables that may be joined and tracked with tenant-level metadata, as will next be described with reference to examples.

In one embodiment and by way of example, metadata may be collected periodically on the core.custom_index_value and core.custom_foreign_key_value tables and high cardinality values (histograms on a per-organization, per-field basis) stored. When a user filters for these values, the cardinality of the result can be estimated quite accurately in many cases based upon the stored metadata.

In some embodiments, a SNL table may be created and maintained to address the issue of disparate name formats and to insure that names are unique across multiple tenants, embodiments include a universal name table that stores all names known to the database. Any filter predicate against one of the known "name" columns (such as Account Name) must be routed first against this table in order to assure that the name is being searched in the correct tenant data area so that the search can proceed properly. This universal name table is made available to the RDBMS native query optimizer with any query by providing the native query optimizer with access to the SNL table when a more efficient query is passed to the native query optimizer in order to insure that names are kept unique across multiple tenants in the database.

Figure 5:
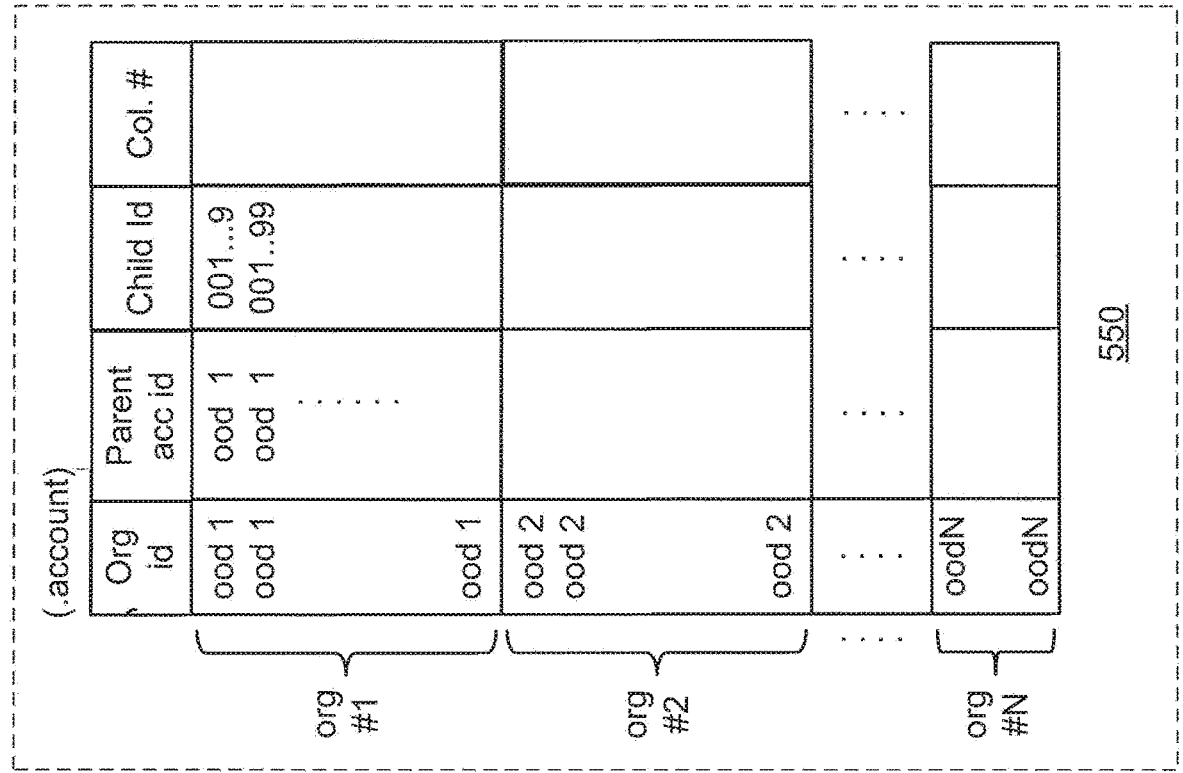
FIG. 5 illustrates an example search name lookup table in an embodiment.
Figure 5:
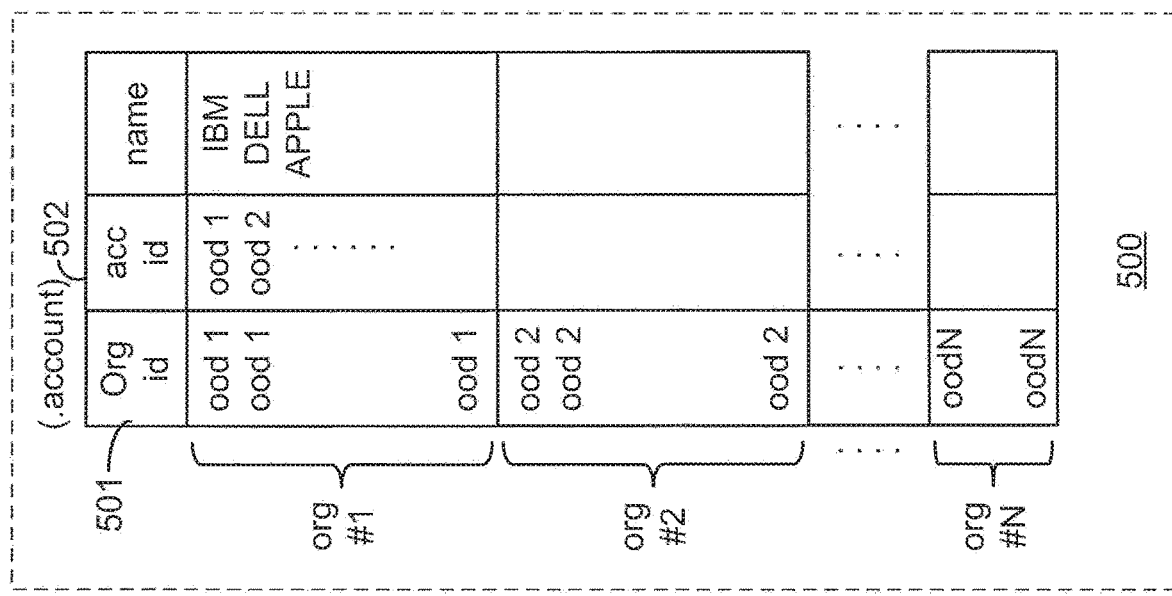

FIG. 5 shows a SNL table according to one embodiment and by way of example. It is noteworthy that there are a wide variety of formats that can be used to organize the information in search name lookup table 500 and that there may be many different forms for the names. For example, the names could be by first, last, both, or reverse order (i.e., last name first).

In some embodiments, a custom field table may include custom fields added or defined by an organization. These custom fields may be inserted into any number of columns of the custom field. Custom fields for multiple tenants are stored in a single field within a custom field data structure, and this single field may contain different data types for each tenant.

Figure 6:
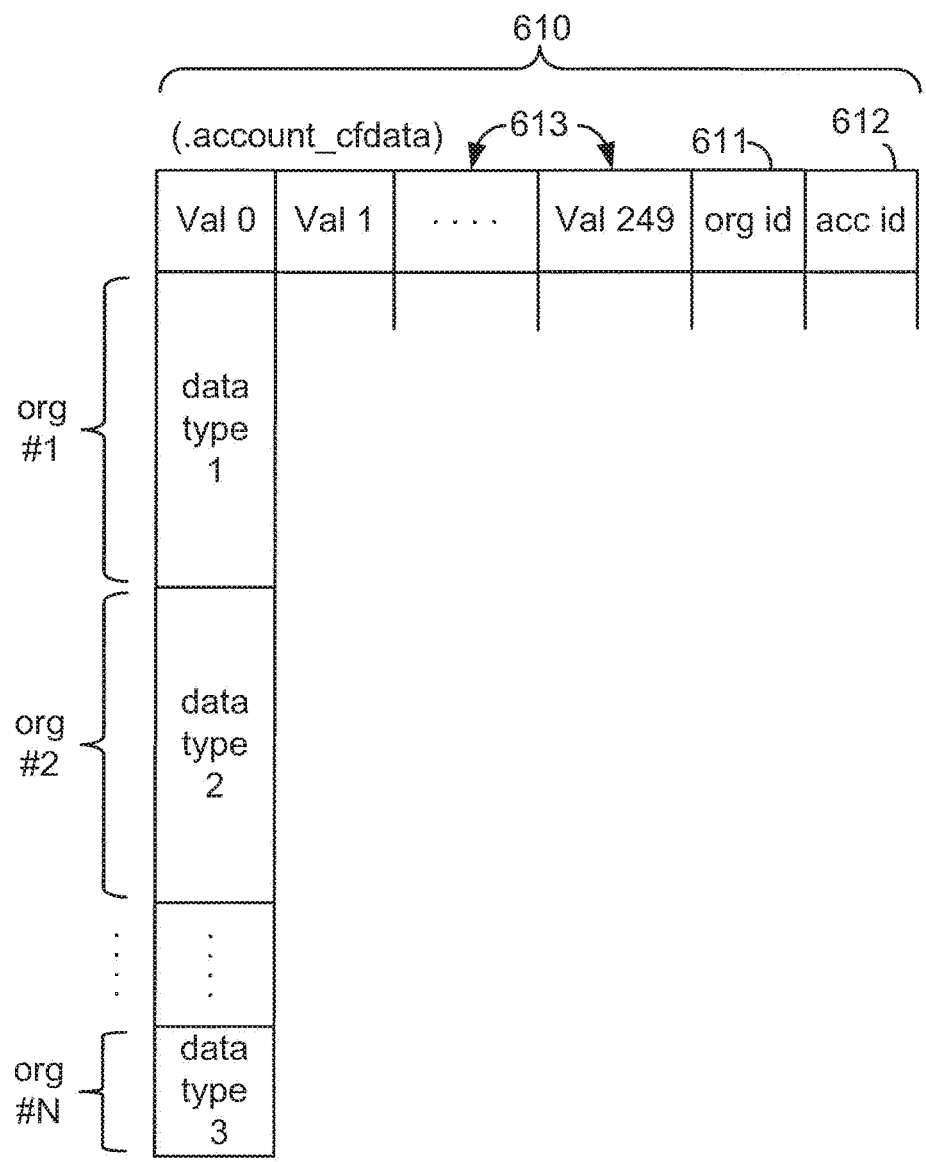
FIG. 6 illustrates an example custom field table in an embodiment.

FIG. 6 illustrates an example custom field table in an embodiment. Custom field table 610 similarly includes an organization ID column 611, an account ID column 612 and plurality of data columns 613. As above, account ID (i.e., "acc id") column 612 acts as the primary key for table 610 and can include the same values as the account ID column 202 of table 200. In the specific example shown, there is a plurality data columns 613 labeled as val0, val1 . . . val249. It is appreciated that any other number may be used as desired, such as, for example, 10 or 100. The account ID 612 may be used as the primary key values as they are globally unique.

In other databases the columns of a table are not indexed as this would generate too much data and lead to inefficient searching. A benefit may be had in indexing select columns. The problem is how to know a priori, which columns will be useful to index. This would be a particularly complex question in a multi-tenant context since a column may be useful to index for one tenant and not useful for another tenant. In one embodiment, each tenant decides which field is indexed for its part of the database. A tenant can add a name to this custom index value and decide for which column of information to create an index.

Now consider the problem of indexing the data in these custom field columns (e.g., columns 613) to allow for fast retrieval. For example, users expect to filter on date values as dates and numeric values as numbers. In order for these filters to work efficiently, given the expressions above used to convert their values, however, it may be necessary to place a functional index (e.g., an Oracle® DB functional index) on each organization's slice of the data in a given custom field column. This may not be possible, however, because the underlying RDBMS may not permit one physical column to contain data in multiple formats. For example, if one tries to create an index on the TO_DATE or TO_NUMBER expressions above, an error would result since other textual values in that physical column would not conform to the desired format.

For the reasons listed above, such "Indexed Custom Fields" are implemented in one embodiment by storing data in a separate set of indexed columns (e.g., a CIV table). In one embodiment, a plurality of additional index columns is provided to allow for indexing custom fields. When a custom field is flagged for indexing by a database administrator, one of the index columns is allocated to that flagged column. Data from the flagged column is copied to the allocated index column. The data is stored in the index column in a format that facilitates searching, e.g., for dates and strings. For example, the YYYYMMDD is itself a searchable format as strings in that format can be compared lexically using normal string comparison.

Figure 7:
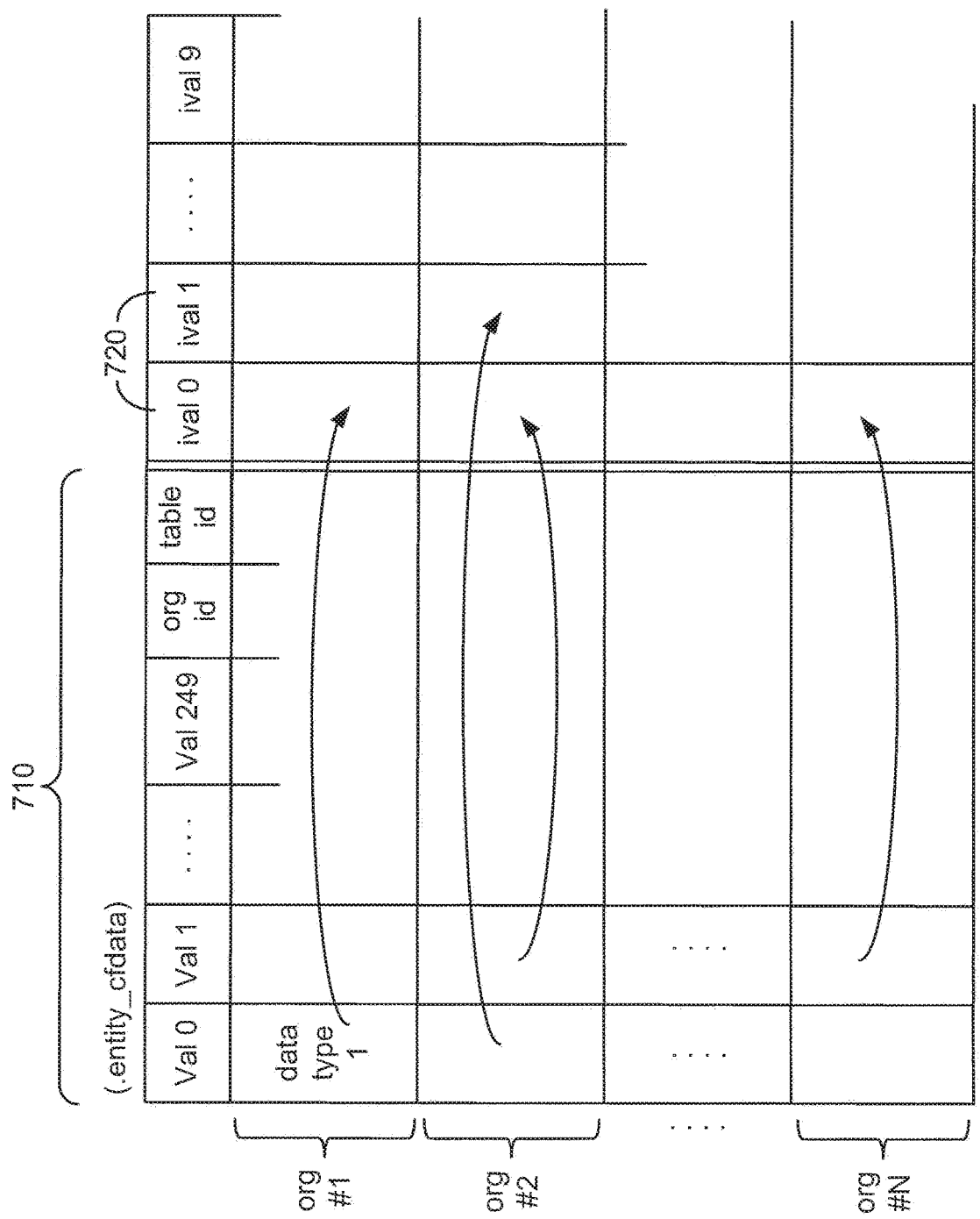
FIG. 7 illustrates an example of a custom object represented as a custom field table including physical index columns in an embodiment.

FIG. 7 illustrates an example of a custom object represented as a custom field table 710 including physical index columns 720 (i.e., a CIV table) according to one embodiment. In one aspect, each custom field data table contains multiple physically indexed columns 720, e.g., using standard B-tree indices. In one embodiment including ten indexed columns, an administrator can designate up to ten custom fields, of string or date types, to be indexed. When a custom field is flagged for indexing, the data in the original column (which is still maintained to display the un-modified format to the user when necessary) is copied to one of these indexed columns. For example, as shown in FIG. 7, custom data field "Val 0" was flagged by the system administrator for organization #1 as an indexed custom column. Data from this flagged column is copied to the index column "ival 0". Similarly, custom data field "Val 1" was flagged by the system administrator for organization #2 as an indexed custom column, and the data from this flagged column is copied to index column "ival 0". At some later time, the system administrator for organization #2 may have flagged another custom field column and the data for this column is copied to another index column (e.g., column "Val 0" data copied to column "ival 1" as shown in FIG. 7). In one aspect, similar to the custom fields, the lowest-numbered index columns are used or filled first.

In order to enable customers to build their own indices, denormalized field values are copied into a universal indexed table at indexed columns 720 (after normalizing text values for case-folded and case-insensitive searching, etc). These custom field values are made available to the RDBMS native query optimizer with any query that references at least one of the custom fields by providing the native query optimizer with access to table 720 when custom fields are filtered.

Within the custom fields of a single tenant, a custom entity may also be created. Each custom entity type may have a different data type stored in the same physical column. The account ID may be used as the primary key values since they are globally unique, but also include an object-specific identifier which may be reused among different entities—a Custom Foreign Key Value (CFKV).

Figure 8:
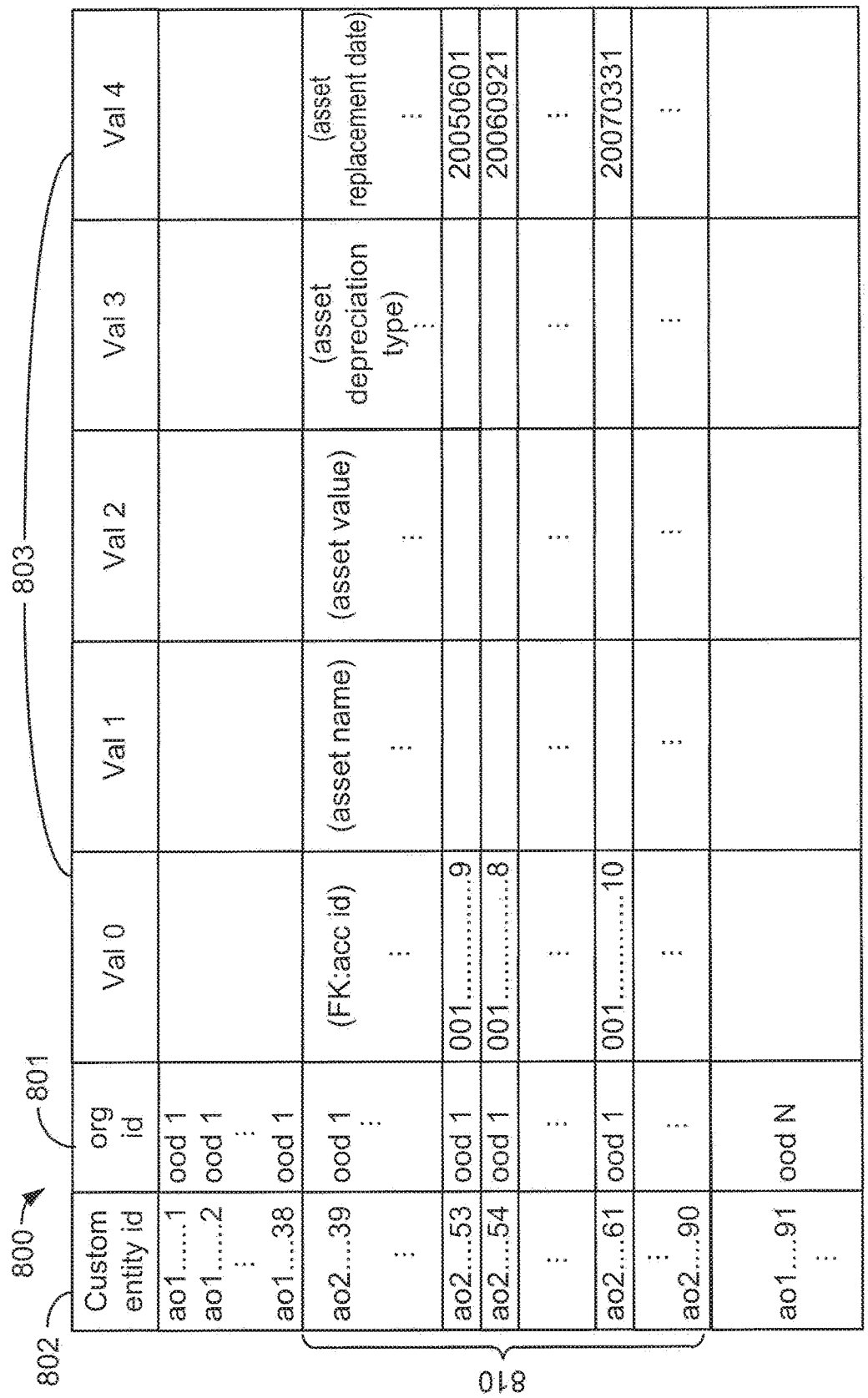
FIG. 8 illustrates an example le of a custom entity object including a custom table for a hypothetical company in an embodiment.

FIG. 8 illustrates an example of a custom entity object in an embodiment. Custom entity object 800 includes a custom table 810 for an organization. As shown, this organization (identified by "ood 1" in org id column 801) has defined a custom object 810 to represent the Assets object. The definition of the custom fields that comprise the Assets object 810 is stored to metadata, e.g., in columns 613 of table 610 in FIG. 6. Assets object 810 has been allocated the prefix "a02" as the custom entity id. Also, as shown, the organization identified as "ood 1" has defined another custom object, e.g., identified by prefix "a01" in custom entity id column 802. A separate column may be provided in table 800 to store the prefixes (e.g., "a01") of the various objects stored in table 800. Assets object 810 has been defined with a custom foreign key column and various data columns. The custom foreign key (FK) column is allocated to the "Val 0" column, whereas data fields for "asset name," "asset value," "asset depreciation type," and "asset replacement date" have been allocated to columns "Val1" to "Val 4", respectively. In this example, the data types for these fields are text, number, picklist, and date respectively.

Assets object 810 is a child custom object of Account object 500. The custom foreign key column connects each row in object 810 to its parent account (in these examples, Account object 500 has been allocated a prefix of "001" for its table ID). For example, the foreign key value "001 . . . 9" connects to the row in table 500 for account name "DELL". Similarly, the foreign key values "001 . . . 8" and "001 . . . 10" connect to the rows in table 500 for account names "IBM" and "APPLE", respectively. Also, as shown, XYZ Corp. (identified by "00dN" in org ID column 801) has defined a custom object to suit their business needs, which custom object is also stored in table 800. As such, any given data column 803 may contain mixed data types depending on the definitions of the various custom objects stored in table 800.

In order to allow an arbitrary number of foreign keys for each tenant, an embodiment can use a reverse index table (e.g., table 550 of FIG. 5) to "reverse index" the foreign key from parent to child. Without joining in this table no query can ever efficiently find all child rows for a particular parent, for one of the custom foreign keys. If an object has many children, it is hard to find all of the children efficiently. Thus, some embodiments may provide a table that lists all of the children for a particular parent.

In some embodiments and by way of example, query normalization (combining disjunctions and conjunctions of similar predicates) is used to reformat a query so as to increase the effectiveness of the above optimizations. For instance, a parallel list of OR equality filters on one field can be combined into a single IN filter (before consulting our metadata), and a parallel set of AND filters can likewise be combined into a single filter.

Combining Sharing and Filters

When the selectivity of the current filter predicates (and other contextual information) and the role of the current user in the sharing paradigm are both known, an embodiment can generate intelligent decisions about query optimization in one of the following three ways.

i. In some situations, a query may lead with a small number of entity rows—either because the query starts with a set of IDs, such as when displaying search results, or because a filter predicate is selective. In such cases, a more efficient query may include a nested loop query syntax leading with the entity IDs.

ii. If the user cannot see many rows, a more efficient query may lead with the sharing tables and access the main entity via the owner field (which is indexed)

iii. Otherwise, if the user is not an administrative user, then a more efficient query may include a hash semi-join against the full set of rows that the user can see.

In addition to enabling faster queries by having an additional indexable field, extra fields may have associated metadata. In one embodiment, the metadata can be updated when data is input for the field. With such metadata, a user query can be optimized for efficiency. For example, ownership metadata may be determined for how many rows are visible to a user. Thus, if a user can see few rows then a query may be optimized by retrieving all of the data in those rows. However, if metadata gathered for a boss show access to many rows, then another method can be used to access the data.

Maintaining Metadata

In one aspect, metadata, including statistics, is tracked for users and organizations. The number of visible rows for each user may be calculated exactly, approximately, or before every Nth query (e.g., every $10^{th}$ query) by a user, that user's visibility is calculated explicitly and then that statistic is used until it is again calculated (here it is assumed that users do not change very often from one role in the sharing paradigm to another role). In yet a further aspect, whenever an unconstrained query is run, the number of visible rows is recorded and that number is used until the user runs the next unconstrained query. In some aspects, such information is tracked periodically (e.g., on a scheduled basis—during off-peak hours, amortizing the work over multiple days).

When data is created, certain statistics are entered into the table, such as ownership, tenant, user ID, and other statistics mentioned herein. This may be done during data manipulation. In this manner, such fields may be used to search based on the owner of the data. This information may also be used to calculate how many other users can view the information based on a hierarchical user structure within a tenant. For example, a manager may be able to see the accounts that people underneath have created. Accordingly, embodiments can provide a payoff in faster queries with little extra work when the data fields are being created.

In one embodiment, each update or insert into an entity table passes through an application server 100. Therefore, as the data is being processed in Java™, counters are incremented and decremented for individual picklist values. Inserts increment a counter, while updates to a different value decrement a counter for the old value and increment a counter for the new value. Since these statistics do not need to be exact, the statistics metadata need not be updated with each and every database insert or update (which might affect performance). Rather, in one aspect, an in-memory cache server (which already contains the metadata for valid picklist values) is augmented with the counters for these values, with the ability to update the database values periodically to persist the changes. An example of such a cache server can be found in U.S. Pat. No. 7,209,929, issued Apr. 24, 2007, titled "JAVA OBJECT CACHE SERVER FOR DATABASES," the contents of which are hereby incorporated by reference in its entirety.

For row deletion, the data need not pass through the application server 100. However, all main entities are soft-deleted (with a modification stamp), meaning the rows are left in the database for possible un-deletion. An asynchronous process may be used to update the statistics when rows are deleted and un-deleted since it is known which rows have been touched since the last time that process was run.

Pre-Fetch Queries

In some instances, metadata may be insufficient to determine whether a particular filter is selective. In such cases, an embodiment can issue a "pre-fetch" query looking for the number of rows directly in the database that match the filter (it will only do this if the answer to that question can be found easily, i.e., a simple fast query can be used as the pre-fetch, and a ROWNUM limit may be used to "exit early"). Normally, issuing such a pre-query (possibly for many separate filters) would be considered too expensive in the general case, however, contextual knowledge can enable a determination whether the up-front cost is worth the effort e.g., before running a possibly very computationally expensive Management Report. In addition, some embodiments may keep row counts for each entity for each tenant and factor this information into the decision of whether to pre-fetch.

While some metadata may be useful in producing a more efficient query, the improvement may only be in removing some possible query paths while other query paths may be seen as being equivalent. When a query path is seen as equivalent, a pre-query fetch may be used. A pre-query fetch looks at how many entries are in a specific query path. If there are too many entries then that query path is disfavored. This is different from other methods that look at random entries to gather metadata. Not only do such methods not look at the results of an actual search, but metadata from such a compilation may not be as directed—the actual search metadata uses concepts such as ownership, tenant, and user ID to gather metadata for the pre-query fetch and utilize the metadata in the most efficient manner, given the structure of these known fields.

User-Specific Sorting

Certain types of user-specified sorting are semantically rich. One example is sorting on multi-currency fields, e.g., a field supporting more than one currency (dollar, yen, euro, etc.). Another example is sorting on translatable picklist fields, e.g., a picklist field that can be translated into various values. Another example is sorting on special application fields such as ActivityDate, which is time-zone- and calendar-specific. In all of these examples, a detailed knowledge of application design and functionality is required.

In an embodiment, the appropriate joins or inline views can be used to achieve the correct application functionality. In one embodiment, this may include augmentation by contextual information retrieved from other areas of the database (for instance, in the case of picklist translation, embodiments may consult picklist-types Java objects and create an Oracle in-memory array for hash joining).

Row Limits

Most UI queries only need to display a small number of rows at a time, which allows for SQL optimizations. In some embodiments techniques are employed to enable critical query re-writing that cannot be done by the native database optimizer, e.g., determining that certain joins can be deferred until after the ROWNUM limit has been placed early in the query. This can be detected from contextual information because, semantically, an application employing the MTS will not change the results of a query with a particular join (for example, joining to the user table to get the name from a user ID will never change the rows in the main query).

Joining Indices

Two or more custom indices (or other primary key-based accelerator tables, like search name lookup) can be joined together as a view from which to drive the query. This allows for a smaller driving set than would have been needed with either index alone, reducing the number of table rows that must be accessed. In one embodiment, standard indices or even a combination of standard and custom indices can also be joined together in order to produce a set of rowids from which to drive the query.

One primary goal has been to choose the best table and index from which to drive a query in order to obtain the best performance. To do this, each filter in a query is analyzed, and if the filter is to be applied to an indexed column, the selectivity of the filter is computed. The indexed filter with the lowest selectivity is then chosen to be the driving filter for the query.

Indices may come in a couple of flavors, for example:
Standard Oracle indices: these are b-tree indices built directly on the data table in the database.
Custom indices and similar accelerator tables: these are stored in a separate indexed table in the database. Querying the custom index table produces a set of primary keys for rows in the main data table that match the filter. These primary keys can then be looked up via the primary key index.

As discussed above, the ability to join two or more custom indices together as an intersection is provided in order to get a smaller set of primary keys. This smaller set can then be used to drive the query, starting with a join to the primary key index of the main data table.

In one embodiment, the intersection of two standard Oracle indices is taken in order to compute a smaller set of rowids from which to drive the query. For example, suppose there is a query such as:

```
select id, name
from account
where CreatedDate = <today> and Owner = <user 1>
```

It may be the case that there are 1 million accounts in total, of which 1000 were created today, 5000 are owned by user 1, and only five are both owned by user 1 and created today. Without using a standard index join, a filter on CreatedDate would be selected as the most selective filter. The query would then scan the index on the created date column to find the 1000 rows which were created today, look each of those rows up in the table, and then filter the set down to the five rows that also match the ownership filter.

Using standard index joins, however, the two indices (on the CreatedDate and Owner columns) can be scanned separately; each index scan produces a set of Oracle rowids which can then be intersected to produce the smaller set of five rowids corresponding to the rows that match both filters. At this point, only the remaining five rows need to be looked up in the table. So, in this example, the number of rows that need to be looked up in the table is reduced from 1000 to five by making use of a standard index join. The tradeoff is that an extra index range scan was done; however, because the data in the index is ordered, the extra index range scan is likely to be much faster than the 995 table row fetches that were saved.

FIGS. 9A-9B show an output (tkprof) demonstrating the performance gains of an index join. The first query (in FIG. 9A) is a standard query with filters on created date and owner; only one index is used. Note the query column, which indicates logical reads—3028. In the second query (in FIG. 9B), the SQL code and the query syntax both look a bit more complex as they were written to produce an index join. The database is able to perform the join before accessing the base table (account), which reduces the number of logical reads down to 48—a considerable increase in efficiency.

Index Joins: Standard-Custom Index Joins

In one embodiment, a standard index can be joined with a custom index. This works in a similar manner to the standard-standard index joins, except that the primary keys from the custom index are joined to the primary key index of the main data table in order to get a set of rowids that can be joined with the rowids from the standard index. In some cases, this join may not be quite as efficient as the standard-standard index join because the cost of the primary key index lookups are paid before the rowcount is reduced with the join, but it can still greatly reduce the number of rows that need to be accessed in the table. Because the data blocks for the table are less likely to be in the database's buffer cache than index blocks, reducing the number of table rows accessed can be important in reducing the number of disk read operations required by a query, which is a very important factor in reducing the overall response time.

Index Joins: Selectivity Calculations

To determine the selectivity of an index join, the process begins with an initial estimate taken by multiplying the selectivity rates of the component filters. For example, if there are filters on CreatedDate and Owner, and it is known that the filter on CreatedDate has a 10% selectivity rate and the filter on Owner has a 5% selectivity rate, then an initial estimate of 5%* 10%=0.5% is used for the selectivity rate of the index join. This is a fairly optimistic estimate, because it assumes no correlation between the component filters. In practice, users may have filters that are highly correlated (such as State=CA and Area Code=415). This type of correlation can be handled with skew adjustments (see below).

Index Joins: Scan Costs

For an index join, the selectivity rate does not tell the whole story as far as the cost of driving the query. If a particular index join between two filters requires that one million rows in each index be scanned and joined together to get an intersection of 100 rows, that computation is clearly more expensive than if there were a single index that could give 100 rows directly. To account for this, in one embodiment, a scan cost is added into the selectivity calculation based on a fraction of the number of index rows that should be scanned for the index join. Thus, in order for it to be beneficial to add an additional filter term into an index join, the gains in overall selectivity should be enough to offset the increase in scan cost from scanning an additional index.

Index Joins: Skew Adjustments

Sometimes there are cases where the initial estimate of selectivity (computed by multiplying the selectivities of the component filters together) is far too optimistic. If there are filters on State=CA and AreaCode=415, for example, it may be the case that the State filter has a selectivity of 10% and the AreaCode filter has a selectivity of 2%, but taken together the overall selectivity is still 2% (because everyone in area code 415 also lives in California) rather than the 0.2% that the naive estimate gives. To handle these cases, in one embodiment, a skew check pre-query is run when the initial selectivity estimate indicates that an index join is the most selective filter in a query. The skew check pre-query, in certain aspects, runs the index join that is used to drive the query, but just computes a rowcount against the indices rather than joining to the data table. This query still tends to be relatively inexpensive, since it queries the indices only and not the tables, and it gives a more exact selectivity for the index join.

Index Joins: Query Generation

To generate a SQL query that is driven by an index join, the query, in certain aspects, is written as a self-join in order to separate the index access from the table access to control the query syntax. For example, a leading subquery, representing the index join (ind), is generated and then that subquery is joined back to the main data table using the rowids to complete the query. Note the example below:

```
select account_id, name
from
    (select /*+ ordered use_hash(t2) */ t1.joinkey
    from
        (select rowid as joinkey
        from sales.account
        where organization_id = '00D300000000XXX'
        and created_date > to_date('2009-04-20 00:00:00')) t1,
        (select rowed as joinkey
        from sales.account
        where organization_id = '00D300000000XXX'
        and owner = '00530000000XXXX') t2
    where t1.joinkey = t2.joinkey) ind, sales.account t
where t.rowid = ind.joinkey
and t.organization_id = '00D300000000XXX'
```

The index join subquery (ind) contains a join of two other subqueries (t1 and t2), each of which is a range scan against a single index. Those two index range scans are joined together based on the rowid which gives the intersection that is used to drive the query.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of improving a query, the method comprising:

receiving, with a server computing device, an original query transmitted by a remote computing device corresponding to a tenant in a multi-tenant database system, wherein the original query is to be performed against data within a database of the multi-tenant database system and at least one column in the database comprises information for tenant-specific filtering of columns within the database, and further wherein the database includes at least a standard index and a custom index at a mapping table that specifies which users or groups of users have access to particular database rows;

retrieving, using a processor of the server computing device, metadata associated with the data accessible only by the tenant in the multi-tenant database system, wherein at least a portion of the data accessible only by the tenant is stored in a common table within the multi-tenant database system;

determining, using the processor, a tenant-selective query syntax by analyzing at least metadata generated from tenant-specific characteristics;

analyzing, using the processor, metadata generated from information about the organization to which the original query corresponds;

generating, using the processor, an improved query using the query syntax, wherein the improved query is based at least in part upon the original query, the tenant-specific filtering of columns, the standard index and the custom index and the analysis of the metadata; and causing the improved query to be executed on the data in the database corresponding to rows and columns within the database determined by the tenant-specific filtering of columns, the standard index and the custom index.

2. The computer-implemented method of improving a query of claim 1 wherein the mapping table that specifies which users or groups of users have access to particular database rows further comprises mapping of users or groups of users to sub-sets of corresponding tenants to generate sub-tenants.

3. The computer-implemented method of improving a query of claim 1 wherein the mapping table that specifies which users or groups of users have access to particular database rows further comprises mapping of a first set users or groups of users from a first tenant and a second set of users or groups of user from a second tenant to a private sharing set of users corresponding at least two tenants to generate a sub-tenant.

4. The computer-implemented method of improving a query of claim 1 wherein the metadata comprises group definition information.

5. The computer-implemented method of improving a query of claim 1 wherein the metadata comprises data sharing rules.

6. The computer-implemented method of improving a query of claim 1 wherein the metadata comprises row access control information and column access control information.

7. The computer-implemented method of improving a query of claim 1 wherein at least one group of users is determined by a join of a first table and a second table, wherein at least one of the first table and the second table comprises metadata.

8. A non-transitory computer-readable medium having stored thereon instructions that, when executed by one or more hardware processors, are configurable to cause the one or more hardware processors to:

receive, with a server computing device, an original query transmitted by a remote computing device corresponding to a tenant in a multi-tenant database system, wherein the original query is to be performed against data within a database of the multi-tenant database system and at least one column in the database comprises information for tenant-specific filtering of columns within the database, and further wherein the database includes at least a standard index and a custom index at a mapping table that specifies which users or groups of users have access to particular database rows;

retrieve, using the server computing device, metadata associated with the data accessible only by the tenant in the multi-tenant database system, wherein at least a portion of the data accessible only by the tenant is stored in a common table within the multi-tenant database system;

determine, using the one or more hardware processors, a tenant-selective query syntax by analyzing at least metadata generated from tenant-specific characteristics;

analyze, using the one or more hardware processors, metadata generated from information about the organization to which the original query corresponds;

generate, using the one or more hardware processors, an improved query using the query syntax, wherein the improved query is based at least in part upon the original query, the tenant-specific filtering of columns, the standard index and the custom index and the analysis of the metadata; and cause the improved query to be executed on the data in the database corresponding to rows and columns within the database determined by the tenant-specific filtering of columns, the standard index and the custom index.

9. The non-transitory computer-readable medium of claim 8 wherein the mapping table that specifies which users or groups of users have access to particular database rows further comprises mapping of users or groups of users to sub-sets of corresponding tenants to generate sub-tenants.

10. The non-transitory computer-readable medium of claim 8 wherein the mapping table that specifies which users or groups of users have access to particular database rows further comprises mapping of a first set users or groups of users from a first tenant and a second set of users or groups of user from a second tenant to a private sharing set of users corresponding at least two tenants to generate a sub-tenant.

11. The non-transitory computer-readable medium of claim 8 wherein the metadata comprises group definition information.

12. The non-transitory computer-readable medium of claim 8 wherein the metadata comprises data sharing rules.

13. The non-transitory computer-readable medium of claim 8 wherein the metadata comprises row access control information and column access control information.

14. The non-transitory computer-readable medium of claim 8 wherein at least one group of users is determined by a join of a first table and a second table, wherein at least one of the first table and the second table comprises metadata.

15. A system having at least a memory device and one or more hardware processors coupled with the memory device, wherein the one or more hardware processors are configurable to:

receive, with a server computing device, an original query transmitted by a remote computing device corresponding to a tenant in a multi-tenant database system, wherein the original query is to be performed against data within a database of the multi-tenant database system and at least one column in the database comprises information for tenant-specific filtering of columns within the database, and further wherein the database includes at least a standard index and a custom index at a mapping table that specifies which users or groups of users have access to particular database rows;

retrieve, using the server computing device, metadata associated with the data accessible only by the tenant in the multi-tenant database system, wherein at least a portion of the data accessible only by the tenant is stored in a common table within the multi-tenant database system;

determine, using the one or more hardware processors, a tenant-selective query syntax by analyzing at least metadata generated from tenant-specific characteristics;

analyze, using the one or more hardware processors, metadata generated from information about the organization to which the original query corresponds;

generate, using the one or more hardware processors, an improved query using the query syntax, wherein the improved query is based at least in part upon the original query, the tenant-specific filtering of columns, the standard index and the custom index and the analysis of the metadata; and cause the improved query to be executed on the data in the database corresponding to rows and columns within the database determined by the tenant-specific filtering of columns, the standard index and the custom index.

16. The non-transitory computer-readable medium of claim 15 wherein the mapping table that specifies which users or groups of users have access to particular database rows further comprises mapping of users or groups of users to sub-sets of corresponding tenants to generate sub-tenants.

17. The non-transitory computer-readable medium of claim 15 wherein the mapping table that specifies which users or groups of users have access to particular database rows further comprises mapping of a first set users or groups of users from a first tenant and a second set of users or groups of user from a second tenant to a private sharing set of users corresponding at least two tenants to generate a sub-tenant.

18. The non-transitory computer-readable medium of claim 15 wherein the metadata comprises group definition information.

19. The non-transitory computer-readable medium of claim 15 wherein the metadata comprises data sharing rules.

20. The non-transitory computer-readable medium of claim 15 wherein the metadata comprises row access control information and column access control information.

* * * * *